United States Patent
Sortomme

(10) Patent No.: US 9,845,016 B2
(45) Date of Patent: Dec. 19, 2017

(54) DISPATCHING VEHICLE-TO-GRID ANCILLARY SERVICES WITH DISCRETE SWITCHING

(71) Applicant: General Electric Technology GmbH, Baden (CH)

(72) Inventor: Eric Sortomme, Redmond, WA (US)

(73) Assignee: General Electric Technology GmbH, Baden (CH)

( * ) Notice: Subject to any disclaimer, the term of this patent is extended or adjusted under 35 U.S.C. 154(b) by 142 days.

(21) Appl. No.: 14/720,508

(22) Filed: May 22, 2015

(65) Prior Publication Data
US 2015/0251548 A1    Sep. 10, 2015

Related U.S. Application Data

(63) Continuation of application No. 13/490,708, filed on Jun. 7, 2012, now Pat. No. 9,054,532.
(Continued)

(51) Int. Cl.
*H02J 7/00* (2006.01)
*B60L 11/18* (2006.01)
*H02J 13/00* (2006.01)

(52) U.S. Cl.
CPC ....... *B60L 11/1809* (2013.01); *B60L 11/1842* (2013.01); *H02J 7/00* (2013.01);
(Continued)

(58) Field of Classification Search
CPC .............. B60L 11/1809; B60L 11/1842; H02J 13/0006; H02J 7/00; H02J 7/0027;
(Continued)

(56) References Cited

U.S. PATENT DOCUMENTS

| 2012/0074901 A1* | 3/2012 | Mohammed ........ B60L 11/1842 320/109 |
| 2013/0015703 A1 | 1/2013 | Rouse et al. |
| 2013/0197710 A1 | 8/2013 | Hansen |

FOREIGN PATENT DOCUMENTS

WO    2011134861    11/2011

OTHER PUBLICATIONS

Pike Research, "Electric Vehicle Market Forecast," 2011, [Online]. Available: http://www.pikeresearch.com/research/electric-vehiclemarket-forecasts.
(Continued)

*Primary Examiner* — Vuthe Siek
(74) *Attorney, Agent, or Firm* — Amin, Turocy & Watson, LLP

(57) ABSTRACT

Techniques for controlling dispatch of electric vehicles (EVs) to perform vehicle-to-grid regulation of power of an electric grid are presented. An aggregator component can individually control transitioning respective EVs of a set of EVs between a charging state and a not-charging state. The aggregator component includes a dispatch controller component (DCC) that can employ a defined dispatch algorithm for EVs to facilitate enabling the DCC to perform unidirectional regulation. The DCC can switch EV charging stations on and off using remote switches to meet a system regulation signal. The DCC can use the dispatch algorithm to make determinations regarding which EV to switch using charging priorities, in accordance defined power regulation criterion (s). The aggregator component can reduce communication signals used to adjust dispatch by sending switching signals to only those EVs of the set of EVs that are changing their charging state at a given time.

20 Claims, 11 Drawing Sheets

Related U.S. Application Data

(60) Provisional application No. 61/606,071, filed on Mar. 2, 2012.

(52) U.S. Cl.
CPC ......... *H02J 13/0006* (2013.01); *H02J 7/0027* (2013.01); *Y02B 70/3216* (2013.01); *Y02E 60/721* (2013.01); *Y02T 10/7005* (2013.01); *Y02T 10/7055* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y04S 10/126* (2013.01); *Y04S 20/221* (2013.01); *Y04S 30/12* (2013.01)

(58) Field of Classification Search
CPC .............. Y02B 70/3216; Y02E 60/721; Y02T 10/7005; Y02T 10/7055; Y02T 10/7072; Y02T 90/121; Y02T 90/128; Y02T 90/14; Y02T 90/16; Y02T 90/163; Y02T 90/168; Y04S 10/126; Y04S 20/221; Y04S 30/12
See application file for complete search history.

(56) References Cited

OTHER PUBLICATIONS

Hadley, et al., "Potential Impacts of Plug-in Hybrid Electric Vehicles on Regional Power Generation," The Electricity Journal, vol. 22, No. 10, pp. 56-68, 2009, 93 pages.

Kempton, et al., "Vehicle-to-grid power implementation: From stabilizing the grid to supporting large-scale renewable energy," Journal of Power Sources, vol. 144, No. 1, pp. 280-294, Jun. 1, 2005, 15 pages.

Kempton, et al., "Vehicle-to-grid power fundamentals: Calculating capacity and net revenue," Journal of Power Sources, vol. 144, No. 1, pp. 268-279, Jun. 1, 2005, 12 pages.

Guille, et al., "A conceptual framework for the vehicle-to-grid (V2G) implementation," Energy Policy, vol. 37, No. 11, pp. 4379-4390, 2009, 103 pages.

C. Quinn, D. Zimmerle, T. H. Bradley, "The effect of communication architecture on the availability, reliability, and economics of plug-in hybrid electric vehicle-to-grid ancillary services," Journal of Power Sources, vol. 195, No. 5, pp. 1500-1509, 2010.

Tomic, et al., "Using fleets of electric-drive vehicles for grid support," Journal of Power Sources, vol. 168, No. 2, pp. 459-468, Jun. 1, 2007, 10 pages.

Chow, et al., "Electricity Market Design: An Integrated Approach to Reliability Assurance", Invited Paper, IEEE Proceeding (Special Issue on Power Technology & Policy: Forty Years after the 1965 Blackout), vol. 93, No. 11, pp. 1956-1969, Nov. 2005.

Han, et al., "Development of an Optimal Vehicle-to-Grid Aggregator for Frequency Regulation," IEEE Transactions on Smart Grid, vol. 1, No. 1, Jun. 2010, pp. 65-72, 8 pages.

Rotering, et al., "Optimal Charge Control of Plug-In Hybrid Electric Vehicles in Deregulated Electricity Markets," IEEE Transactions on Power Systems, vol. 26, No. 3, pp. 1021-1029, 2011.

E. Sortomme and M. A. El-Sharkawi, "Optimal Scheduling of Vehicle-to-Grid Energy and Ancillary Services," IEEE Transactions on Smart Grid, vol. 3, No. 1, Mar. 2012, 9 pages.

E. Sortomme and M. A. El-Sharkawi, "Optimal Charging Strategies for Unidirectional Vehicle-to-Grid," IEEE Transactions on Smart Grid, vol. 2, No. 1, pp. 131-138, 2011.

E. Sortomme and M. A. El-Sharkawi, "Optimal Combined Bidding of Vehicle-to-Grid Ancillary Services," IEEE Transactions on Smart Grid, vol. 3, No. 1, Mar. 2012, 10 pages.

"Electric Vehicle Smart Charging Station," 2010, AeroVironment EV Solutions, http://evsolutions.avinc.com/uploads/products/2_AV_EVSE-LS_B2B_061010_retail_smart.pdf, 1 page.

"Leaf Specs," 2010, Nissan Zero Emission Website, http://www.nissan-zeroemission.com/EN/LEAF/specs.html, 2 pages.

Electric Reliability Council of Texas, "Market Information," Aug. 2010, [Online]. Available: http://www.ercot.com/mktinfo/.

Federal Highway Administration, "National Household Travel Survey," 2010, [Online]. Available: http://nhts.ornl.gov/.

Office Action dated Aug. 19, 2014 for U.S. Appl. No. 13/490,708, 70 pages.

\* cited by examiner

DISPATCHING VEHICLE-TO-GRID ANCILLARY SERVICES WITH DISCRETE SWITCHING

CROSS-REFERENCE TO RELATED APPLICATIONS

This application is a continuation of, and claims priority to each of, U.S. patent application Ser. No. 13/490,708, filed on Jun. 7, 2012, and entitled "DISPATCHING VEHICLE-TO-GRID ANCILLARY SERVICES WITH DISCRETE SWITCHING," which claims priority to U.S. Provisional Application No. 61/606,071, filed Mar. 2, 2012, and entitled "DISPATCHING VEHICLE-TO-GRID ANCILLARY SERVICES WITH DISCRETE SWITCHING," the entireties of which applications are hereby incorporated herein by reference.

BACKGROUND

Electric vehicles (EVs) potentially can provide valuable services to a utility grid through vehicle-to-grid (V2G). In order to take advantage of V2G services, aggregators of EVs attempt to schedule and dispatch large groups of EVs in accordance with market rules. There have been numerous studies looking at aggregator scheduling algorithms. However, there has been relatively little work on algorithms relating to the actual dispatch of EVs.

Conventional dispatch uses incremental dispatch for the dispatching of a group of EVs. However, incremental dispatch of a group of EVs can have deficiencies due to more expensive charging station costs and/or high communication overhead. The above-described background is merely intended to provide a contextual overview of scheduling and dispatching groups of EVs in relation to a utility grid via V2G, and is not intended to be exhaustive.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

The disclosed subject matter can include an aggregator component that can individually and/or discretely control transitioning (e.g., switching) respective electric vehicles (EVs) (e.g., plug-in electric vehicles (PEVs), plug-in hybrid electric vehicles (PHEVs)) of a set (e.g., an aggregated group) of EVs between a charging state and a not-charging state. The aggregator component can comprise a dispatch controller component that can employ a defined dispatch algorithm for EVs that can facilitate enabling the dispatch controller component to perform unidirectional regulation of power in relation to a utility grid (e.g., electric power grid). The dispatch controller component, using the defined dispatch algorithm, can switch EV charging stations between an on state and an off state (e.g., an on or charging state, off or not-charging state) using remote switches to meet a system regulation signal. The dispatch controller component can use the defined dispatch algorithm to make determinations (e.g., decisions) regarding which EV(s) of the set of EVs to switch (e.g., switch to a charging state, switch to a not-charging state) using charging priorities, in accordance with one or more defined power regulation criterion. The defined dispatch algorithm can allow for less expensive and/or complex infrastructure and a significant reduction in the required communications signals, as compared to conventional dispatch systems and methods. Simulations of an example implementation of the disclosed subject matter, using the defined dispatch algorithm, for a group of 1000 EVs in the Electric Reliability Council of Texas (ERCOT) system over a 24-hour period verify the improved performance of the defined dispatch algorithm, disclosed herein, over conventional incremental dispatch algorithms.

The disclosed subject matter can include a system comprising an aggregator component that aggregates and manages charging of a set of EVs associated with an electric grid. The system also can include a dispatch controller component that controls switching of at least a subset of EVs of the set of EVs between an on state and an off state at a given time, based at least in part on respective priority levels of respective EVs in the set of EVs.

The disclosed subject matter also can include a method, comprising aggregating, by a system including at least one processor, a set of EVs associated with an electric grid to facilitate charging of respective EVs in the set of EVs. The method also can comprise controlling, by the system, switching of at least a subset of EVs of the set of EVs between a charging state and a not-charging state at a given time, based at least in part on respective priority levels of the respective EVs in the set of EVs.

The disclosed subject matter further can comprise a non-transitory computer-readable storage medium storing computer-executable instructions that, in response to execution, cause a system including at least one processor to perform operations, comprising: aggregating a set of EVs associated with an electric grid to facilitate charging of respective EVs in the set of EVs; and controlling transitioning of at least a subset of EVs of the set of EVs between a charging state and a not-charging state at a given time, based at least in part on respective priority levels of the respective EVs in the set of EVs.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
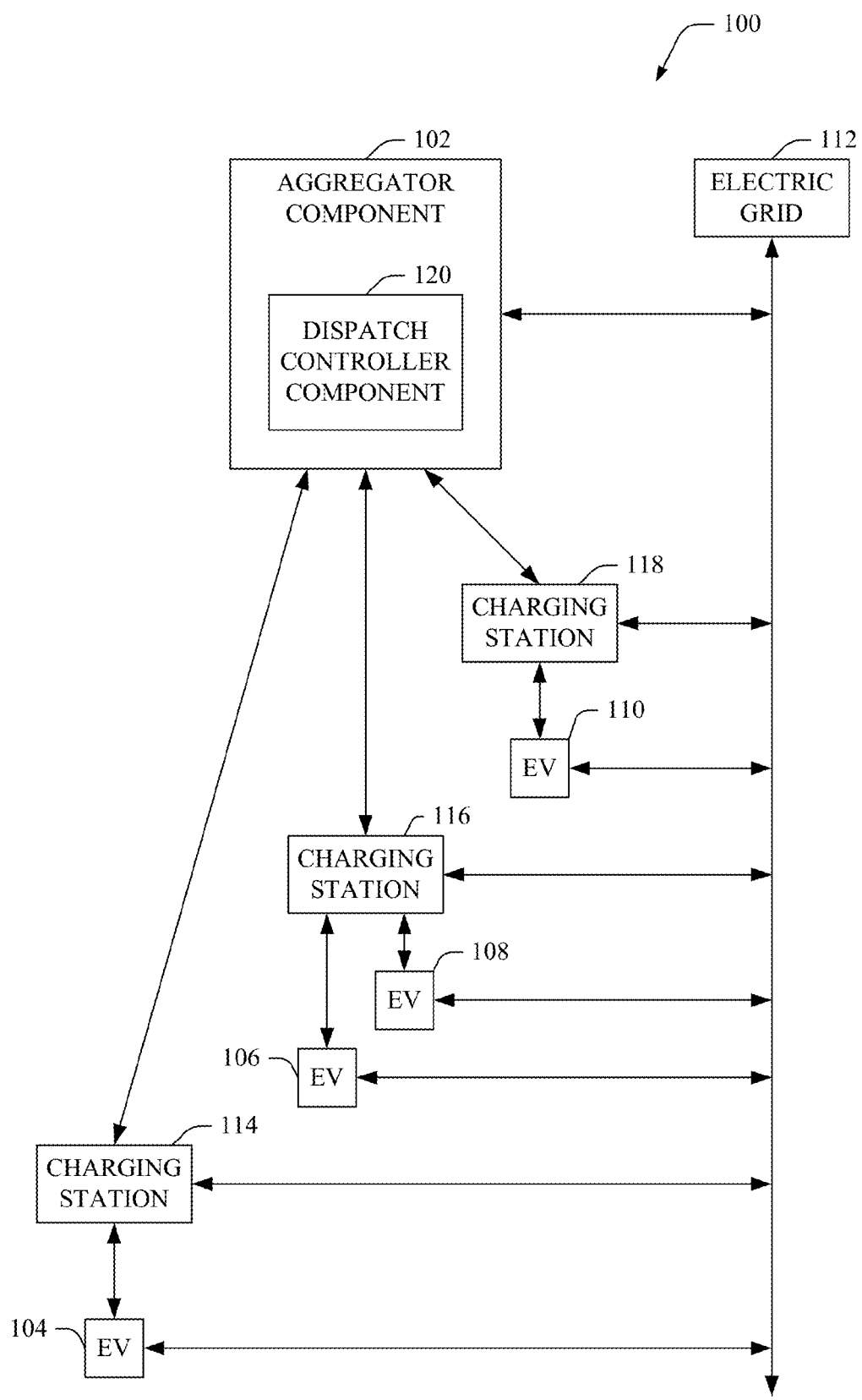
FIG. 1 illustrates a block diagram of an example system that can control switching of electric vehicles (EVs) in a vehicle-to-grid (V2G) environment to facilitate controlling power generation and managing variations of load demand for an electric grid in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

The disclosed subject matter can mitigate the problem of unidirectional vehicle-to-grid (V2G) dispatch of regulation and reserves from an aggregator perspective, for example, if the electric vehicle (EV) chargers are to be (e.g., can only be) controlled through remote switching on or off. The disclosed subject matter also can reduce the number of communication signals required to meet the dispatch of EVs of a group of EVs, as compared to conventional dispatch. In some implementations, one or more of the EVs can be V2G-capable EVs.

In one embodiment, this disclosed subject matter can include an aggregator component that can individually and/or discretely control transitioning (e.g., switching) respective EVs (e.g., plug-in electric vehicles (PEVs), plug-in hybrid electric vehicles (PHEVs)) of a set (e.g., an aggregated group) of EVs between an on state (e.g., a charging state) and an off state (e.g., a not-charging state). The aggregator component can comprise a dispatch controller component that can employ a defined dispatch algorithm for EVs that can facilitate enabling the dispatch controller component to perform unidirectional regulation of power in relation to a utility grid (e.g., electric power grid).

The dispatch controller component, employing the defined dispatch algorithm, can meet the system regulation signal by individually and/or discretely switching certain (e.g., a subset of) electric vehicles (EVs) (e.g., plug-in electric vehicles (PEVs), plug-in hybrid electric vehicles (PHEVs)) between an on state (e.g., a charging state) or an off state (e.g., a not-charging state) in a binary fashion within a larger aggregated group of EVs. This can reduce the complexity of the infrastructure needs as the disclosed subject matter can be implemented by using a remote switch on the charging station. The disclosed systems (e.g., including the aggregator component and dispatch controller component), methods, and techniques can reduce the number of communication signals used to meet the dispatch to EVs of a set (e.g., group(s)) of EVs, since adjustments in the dispatch only require communicating signals (e.g., switching signals) to those EVs (e.g., via an associated charging station(s)) of the set of EVs that are changing their charging state, as opposed to communicating signals to the entire set of EVs. The dispatch controller component, using the defined dispatch algorithm, also can account for the energy requirement of the charging EVs and can ensure that the EVs receive similar amounts of charge, as compared to the amount of charge that would be received by EVs when using incremental dispatch techniques.

EV adoption can be expected to increase rapidly in the next few years. This can add significant new load to the national electric grid. One way that has been proposed to integrate large numbers of EVs is through V2G, which can be defined as the provision of energy and ancillary services from an EV to the electric grid. V2G seeks to transform EVs from potentially problematic loads for an electric grid into distributed energy resources that can generate value for both the EV owners and the utility entity whose electric grid has the EVs connected thereto. V2G-capable EVs can provide many services to an electric grid, such as, for example, peak shaving, frequency regulation, and spinning and non-spinning reserves.

Because a single EV typically does not have adequate capacity to participate in wholesale energy markets, aggregators can be used to combine the capacities of many EVs. An aggregator can be a utility managing EVs on its distribution system, or a third party operating a virtual power plant. The aggregator can be a market participant that can bid the combined capacities of the EVs into the appropriate market. It has been shown that frequency regulation can be one beneficial service that EVs can offer to an electric grid.

Recently there have been a number of studies on V2G scheduling optimization from the aggregator perspective. These studies have primarily focused on determining the most profitable time to provide regulation capacity and how much capacity to schedule. In some of these studies, dispatch algorithms were developed for EVs which relied on incremental increases or decreases in the charge rate. One significant problem with these conventional dispatch algorithms is that the charging stations required for incremental increase and decrease in power can be more expensive than other relatively simpler types of charging stations. Another problem can be the significant amount of communication overhead required to send a new signal to every EV participating in V2G every time there is a new dispatch level.

The disclosed subject matter can employ dispatch techniques, systems, and methods for EVs participating in V2G regulation. The dispatch techniques, systems, and methods disclosed herein can provide desirable (e.g., efficient) control of switching of EVs. This disclosed subject matter can meet the regulation signal by switching certain EVs on or off in a binary fashion within the larger aggregated group of EVs. This can reduce infrastructure needs over conventional systems and methods, since the disclosed subject matter can be implemented using a remote switch on the charging station. The disclosed subject matter also can reduce communication overhead as compared to conventional systems and methods. In accordance with the disclosed subject matter, the number of communication signals used to control switching of EVs can be reduced or minimized as compared to conventional systems and methods, since adjustments in the dispatch in relation to a group of EVs can be performed, for example, by signaling only those EVs that are changing their charging state, as opposed to communicating signals to the entire group of EVs. The defined dispatch algorithm also can account for the energy requirement of the charging EVs and can ensure that the EVs receive relatively similar amounts of charge as that received by EVs when using certain conventional incremental dispatch methods. Simulations over a 24-hour period on the Electric Reliability Council of Texas (ERCOT) system demonstrated that the performance of this defined dispatch algorithm of the disclosed subject matter in regulating power generation of the system can be comparable with certain conventional incremental dispatch techniques while significantly reducing the number of communication signals sent, as compared to those conventional incremental dispatch techniques.

It can be desirable for utilities to constantly, or at least substantially continuously, balance power generation with the load fluctuations within their control areas. The frequency of the system can be related to the energy imbalance: when generation is greater than the load, the frequency can be greater than the target (e.g., 50 Hertz (Hz) or 60 Hz depending on the country); when the load is greater than the power generation, the frequency can be less than the target frequency. Utilities typically can send out a regulation signal at periodic times (e.g., in the range of seconds, such as, for example, every two to six seconds) to adjust generation output to match the loads.

With regard to regulation and automatic generation control, it can be desirable for each control area to be able to regulate generation to meet the daily variations of load demand. This generation regulation can include several aspects, including frequency response, area control error (ACE), and automatic generator control (AGC):

1) Frequency response: It can be desirable (e.g., required) for all energy resources above a certain size to be equipped with capability of responding to system frequency deviation due to load ramps and generator trips. For example, governors typically can provide a defined amount of droop (e.g., 5% droop) and it can be desirable for the governors to be responsive to frequency deviations outside of a pre-specified band.

2) ACE: ACE represents the shift in the generation in the control area required to restore frequency and the net interchange to its desired value, and is given by $$ACE = -\Delta P_{net\ int} - 10B\Delta f, \quad \text{EQ. (1)}$$

where $\Delta P_{net\ int}$ is the deviation in megawatts (MW) of the interchange from the desired value, $\Delta f$ is the frequency deviation in Hz, and B (e.g., in MW/0.1 Hz) is the bias set as close as possible to the control area's frequency response.

3) AGC: AGC is typically installed at a central location, such as the power grid operator, as a means of coordinating the generation available in a control area to restore ACE to zero. The control logic aims at driving the overall ACE as well as individual unit generation deviation to zero. Generation set points from AGC calculation typically can be issued periodically (e.g., in the range of seconds, such as, for example, every two to six seconds).

A single EV can perform unidirectional frequency regulation while charging by increasing and decreasing (e.g., modulating) its charging rate around a set point called a preferred operating point (POP). As a result, an EV can even perform V2G without discharging energy back into the system. This regulation down capacity can be the capacity to increase the charging rate of an EV above the POP. The regulation up capacity can be the capacity to decrease the charging rate from the POP.

In certain conventional schemes, it has been proposed that an aggregator could manage a group of EVs by combining their individual POPs to set as its POP when bidding regulation into the market. Dispatch would then be accomplished by sending signals to the SAE J1772 charging stations to have them remotely adjust the pilot signal that informs the EVs of the maximum charge rate possible. In this way, the charge rate of the EV can increase and decrease to follow the regulation signal without having to add any additional hardware to the EV itself. One problem with these conventional schemes that dispatch EVs in this manner is that the smart charging stations that can receive a remote signal and incrementally adjust their pilot signals are more expensive than charging stations using fixed pilot signals. Another problem with these types of conventional schemes is that a dispatch signal has to be sent to every EV in the group of EVs with each new increment. This communication cost can be unacceptably high.

The disclosed subject matter can overcome these and/or other deficiencies of the conventional schemes, while also being able to desirably regulate power generation including managing variations of load demand for an electric grid. The disclosed subject matter can attain desirable regulation of power generation while having lower infrastructure expense and communication overhead than the conventional schemes described supra.

Referring to the drawings, FIG. 1 is a block diagram of an example system 100 that can control switching of EVs in a V2G environment to facilitate controlling power generation and managing variations of load demand for an electric grid in accordance with various aspects and embodiments of the disclosed subject matter. The system 100 can include an aggregator component 102 that can aggregate, and control charging and switching, of a set of EVs, comprising EV 104, EV 106, EV 108, and EV 110, which can be associated with (e.g., electrically and/or communicatively connected to) an electric grid 112 at various given times. The electric grid 112 can provide power to the set of EVs and/or other components (e.g., homes, offices, etc.) associated with the electric grid 112. The aggregator component 102 can be associated with (e.g., owned, operated, and/or managed by) an entity (e.g., aggregator), such as, for example, a utility company that can operate the electric grid 112 or a third-party service provider.

The system 100 also can include a plurality of charging stations, including charging station 114, charging station 116, and charging station 118, that can facilitate charging the power components (e.g., rechargeable batteries) of EVs (e.g., 104 through 110) respectively associated with those charging stations (e.g., 114, 116, 118). The plurality of charging stations (e.g., 114, 116, 118) can be associated with (e.g., electrically and/or communicatively connected to) the aggregator component 102 and/or EVs (e.g., 104 through 110) respectively associated with (e.g., electrically and/or communicatively connected to) the charging stations (e.g., 114, 116, 118), e.g., at various given times. In accordance with various implementations, a charging station can be located at a home, an office building, and/or a business that provides EV charging services, etc. In some implementations, the set of EVs (e.g., 104 through 110) and/or the plurality of charging stations (e.g., 114, 116, 118) can be associated with (e.g., via respective owners or operators of the EVs and/or charging stations) subscriptions with the entity (e.g., aggregator) associated with the aggregator component 102.

The aggregator component 102 can include a dispatch controller component 120 that can control switching (e.g., automatically and/or dynamically) of respective EVs (e.g., 104 through 110) associated with the electric grid 112 between an on state (e.g., charging state) and an off state (e.g., not-charging state) at desired times to facilitate regulating power generation by the electric grid 112, including regulating power generation in relation to varying load demands on the electric grid 112, and providing electrical power to the set of EVs (e.g., 104 through 110) to charge the respective power components of the EVs (e.g., 104 through 110). The dispatch controller component 120 can switch charging states of the EVs (e.g., 104 through 110) between the on state and the off state to make the discretized regulation signal of the aggregate of the EVs (e.g., the set of EVs, including EVs 104 through 110) match, or at least substantially match, the regulation signal associated with the electric grid 112 using discrete switching of EVs as opposed to conventional incremental adjustment.

For each scheduling period, the dispatch controller component 120 can assign each EV of the set of EVs a target percentage of the total aggregator energy dispatched during that scheduling period. This can be based at least in part on the EVs schedule using, for example, a V2G optimization algorithm(s). As more fully disclosed herein, the dispatch controller component 120 can assign each EV in the set of EVs a respective priority level for charging of the EVs relative to the other EVs in the set of EVs, wherein switching of charging states of the EVs can be based at least in part on the respective priority levels of the EVs. To facilitate controlling switching of the EVs (e.g., 104 through 110), the dispatch controller component 120 can utilize the defined dispatch algorithm, in accordance with defined power regulation criterion.

The dispatch controller component 120 can regulate power generation of the electric grid 112 at least in part by controlling switching (e.g., binary switching) of each individual EV (e.g., 104 through 110) around the aggregator's POP (e.g., the POP for the aggregator component 102). To achieve this, the dispatch controller component 120 can add the POP to the regulation signal received by the system operator. The dispatch controller component 120 can determine the number of EVs of the set of EVs (e.g., 104 through 110) that are to be used (e.g., switched on to charging state in relation to the electric grid 112) to meet that energy level associated with the POP based at least in part on the respective power draws of the EVs (e.g., 104 through 110) when switched to the on state. The dispatch controller component 120 can employ defined logic, in accordance with defined regulation criterion, to facilitate determining which EVs (e.g., 104 through 110) are to be switched to the on state to be charged by the electric grid 112 (e.g., via the respective charging stations 114, 116, and/or 118) based at least in part on the respective energy needs of those respective EVs for a specified time period (e.g., a specified time period of less than an hour, a one-hour time period, a specified time period of greater than one hour).

The dispatch controller component 120 can communicate dispatch signals to those EVs (e.g., only those EVs) of the set of EVs that are changing state (e.g., changing from an off state to an on state to be charged by the electric grid 112; changing from an on state to an off state to discontinue being charged by the electric grid 112). In some implementations, the dispatch controller component 120 can transmit dispatch signals to those EVs in a subset of the set of EVs that are to change their charging state to those EVs in the subset of EVs or to charging stations in a subset of charging stations (e.g., charging station(s) 114, 116, and/or 118) respectively associated with those EVs in the subset of EVs. In response to receiving the dispatch signals (e.g., switching signals), the respective EVs in the subset of EVs, via those EVs themselves and/or respective associated charging stations, can change their charging state from a current charging state to a different charging state, in accordance with the dispatch signals.

Figure 2:
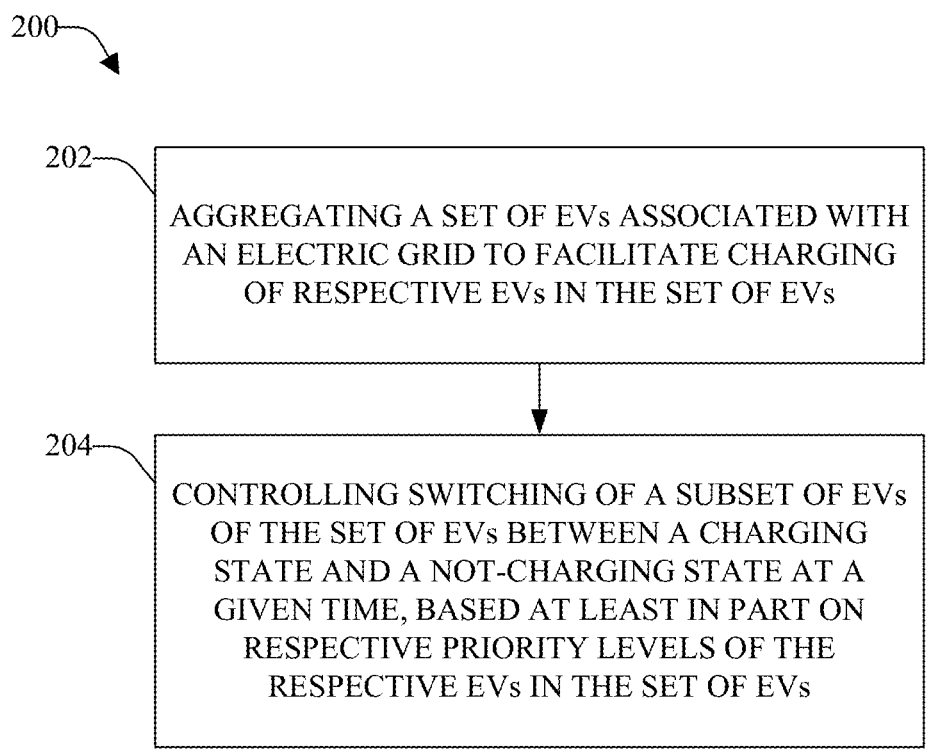
FIG. 2 illustrates a diagram of a flowchart of an example method for controlling switching of EVs in a V2G environment to facilitate controlling power generation and managing variations of load demand for an electric grid in accordance with various aspects and embodiments of the disclosed subject matter.
Figure 3:
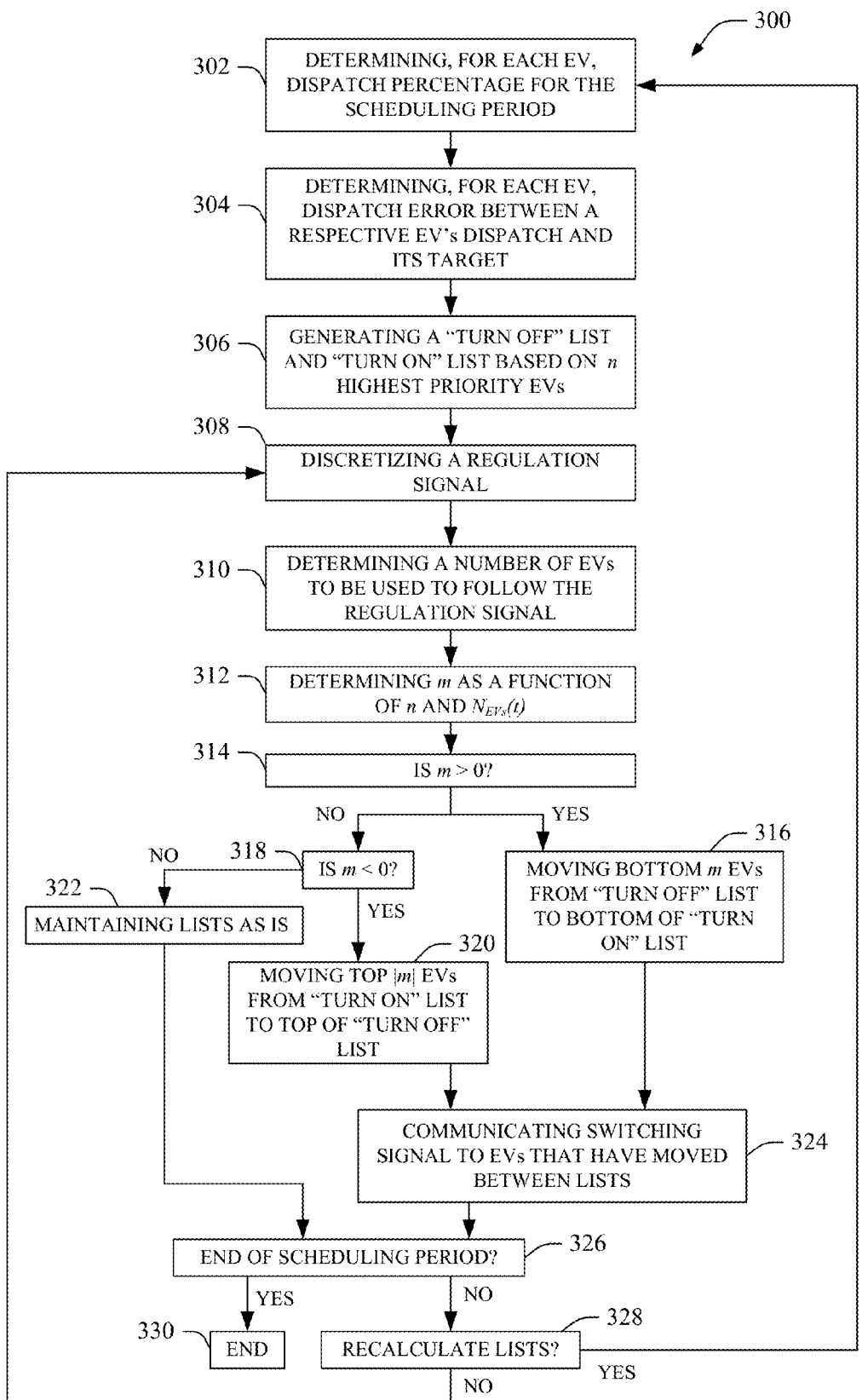
FIG. 3 depicts a diagram of a flowchart of another example method for controlling switching of EVs in a V2G environment to facilitate controlling power generation and managing variations of load demand for an electric grid in accordance with various aspects and embodiments of the disclosed subject matter.

In view of the example systems, components, and devices described herein, example methods that can be implemented in accordance with this disclosure can be further appreciated with reference to flowcharts in FIGS. 2-3. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

FIG. 2 depicts a diagram of a flowchart of an example method 200 for controlling switching of EVs in a V2G environment to facilitate controlling power generation and managing variations of load demand for an electric grid in accordance with various aspects and embodiments of the disclosed subject matter. The method 200 can be utilized by, for example, an aggregator component (e.g., aggregator component 102), which can include a dispatch controller component (e.g., dispatch controller component 120).

At 202, a set of EVs associated with an electric grid can be aggregated to facilitate charging of respective EVs in the set of EVs. The aggregator component can aggregate the set of EVs. The aggregator component can be associated with one or more entities (e.g., aggregator, such as a utility associated with (e.g., owning or operating) the electric grid or a third-party aggregator (e.g., owning or operating a virtual power plant associated with the electric grid)).

At 204, switching of a subset of EVs of the set of EVs between a charging state and a not-charging state at a given time can be controlled, based at least in part on respective priority levels of the respective EVs in the set of EVs. The dispatch controller component can identify (e.g., detect, measure, etc.) respective priority levels of the respective EVs in the set of EVs. The dispatch controller component can control switching of the subset of EVs of the set of EVs between the charging state and the not-charging state at the given time, based at least in part on respective priority levels of the respective EVs in the set of EVs, in accordance with a defined dispatch algorithm.

For example, the dispatch controller component can execute the defined dispatch algorithm to facilitate identifying EVs that are to be included in the subset of EVs that are to be switched between the charging state and the not-charging state at the given time, based at least in part on respective priority levels of the respective EVs in the set of EVs. In accordance with the defined dispatch algorithm, the dispatch controller component generate a dispatch signal(s) (e.g., switching signal(s)) and can transmit the dispatch signal(s) to the respective EVs in the subset of EVs or to a subset of charging stations respectively associated with the respective EVs in the subset of EVs to facilitate switching the respective EVs in the subset of EVs between the charging state and the not-charging state at the given time. In response to the respective EVs in the subset of EVs or the subset of charging stations receiving the dispatch signal(s), the EVs in the subset of EVs and/or the charging station(s) in the subset of charging stations can switch the respective EVs in the subset of EVs from a current charging state to a different charging state.

Turning to FIG. 3 (and referring again to FIG. 1), FIG. 3 illustrates a diagram of a flowchart of another example method 300 for controlling switching of EVs in a V2G environment to facilitate controlling power generation and managing variations of load demand for an electric grid in accordance with various aspects and embodiments of the disclosed subject matter. The method 300 can be implemented by the aggregator component 102, including the dispatch controller component 120, for example.

At 302, a dispatch percentage ($DisPer_i$) of each EV of the set of EVs (e.g., 104 through 110) can be determined for each scheduling period, for example, using EQ. (3) (e.g., by the dispatch controller component 120). At 304, for each EV of the set of EVs (e.g., 104 through 110), an error ($DisEr_i$) (e.g., dispatch error) between a respective EV's dispatch up to that point in the scheduling period and its target (e.g., target dispatch) can be determined, for example, using EQ. (4) (e.g., by the dispatch controller component 120).

In some implementations, the dispatch controller component 120 can determine (e.g., calculate) the dispatch percentage for each EV (e.g., using EQ. (3), as more fully disclosed herein) of the set of EVs, and can use the respective dispatch percentages of the respective EVs of the set of EVs to calculate the respective priorities of the respective EVs (e.g., EVs 104 through 110) for dispatch. The dispatch controller component 120 can determine the priority of an EV as a function of the expected value of energy to be received by the EV, which can be given from the scheduling algorithm (e.g., charging scheduling algorithm) used in relation to EVs in the set of EVs (e.g., EVs 104 through 110). In accordance with various implementations, a scheduling algorithm(s) can take into account EV availability, usage history of an EV, customer constraints associated with an EV, current battery state of charge (SOC) of an EV, system energy and ancillary services prices associated with the system (e.g., 100), etc., to determine the amount of regulation capacity that can be bid into the market each hour from each EV of the set of EVs (e.g., EVs 104 through 110).

From those capacities, the dispatch controller component 120, or another component associated with the aggregator component 102, can determine (e.g., calculate) an expected value of energy received by the EV over the scheduling period. This expected value of energy received by an EV during period P using desired (e.g., optimal) scheduling strategies can be given by, for example, $$En_i(P)=POP_i(P)-RegU_i(P) \cdot Ex_U+RegD_i(P) \cdot Ex_D \quad \text{EQ. (2)}$$

wherein:

$En_i(P)$ is the expected value of the energy to be received over the scheduling period by the $i^{th}$ EV;

$RegU_i(P)$ is the regulation up capacity of the $i^{th}$ EV during period P;

$RegD_i(P)$ is the regulation down capacity of the $i^{th}$ EV during period P;

$Ex_U$ is the expected value of regulation up dispatch over a period;

$Ex_D$ is the expected value of regulation down dispatch over a period; and wherein the dispatch controller component 120, or another component associated with the aggregator component 102, can determine the values for $Ex_U$ and $Ex_D$ from historical data.

Using the expected value of energy received for the EVs, respectively, the dispatch controller component 120 can identify (e.g., determine, calculate) the priority of each EV of the set of EVs (e.g., EVs 104 through 110) from that EV's dispatch percentage and that EV's dispatch percentage error ($DisEr_i$), which can be given by, respectively, $$DisPer_i = \frac{En_i(P)}{\sum_{i=1}^{cars} En_i(P)} \quad \text{EQ. (3)}$$

$$DisEr_i = \frac{\left( DisPer_i - \frac{\sum_{\tau=1}^{t} EVDisp_i(\tau)}{\sum_{i=1}^{cars}\sum_{\tau=1}^{t} EVDisp_i(\tau)} \right)}{DisPer_i} \quad \text{EQ. (4)}$$

wherein $DisPer_i$ is the percentage of the total aggregator's dispatch to be met by the $i^{th}$ EV;

$DisEr_i$ is the error between an EV's dispatch up to that point in the scheduling period and that EV's target; and $EVDisp_i$ is the dispatches for the $i^{th}$ EV over the scheduling period.

At 306, a "turn off" list and a "turn on" list can be generated (e.g., constructed, created, built, etc.), each containing respective subsets of EVs of the set of EVs, based at least in part on the n highest priorities of EVs of the set of EVs to meet the POP associated with the aggregator component (e.g., 102). The value of n can be virtually any desired integer number ranging up to the number of EVs in the set of EVs, and can be determined and/or set based at least in part on one or more defined dispatch criterion. To facilitate reducing rapid toggling of switching states of the EVs (e.g., EVs 104 through 110) while charging, the dispatch controller component 120 can generate the "turn off" list and the "turn on" list. The dispatch controller component 120 can place (e.g., insert) the EVs, respectively, into the "turn on" list or the "turn off" list based at least in part on the respective priority values of the respective EVs (e.g., EVs 104 through 110). For example, the dispatch controller component 120 can place a first grouping (e.g., "turn on" grouping) of EVs of a set of EVs associated with the aggregator component 102 on the "turn on" list and a second grouping (e.g., "turn off" grouping) of EVs of the set of EVs on the "turn off" list based at least in part on the respective priority values of the respective EVs.

The "turn off" list can include the n EVs of the set of EVs (e.g., EVs 104 through 110) that can be desired (e.g., required) to meet the aggregator POP associated with the aggregator component 102 and thus can be available to be turned (e.g., switched) to the off state. The "turn off" list can be populated by the n EVs with the highest dispatch priority (e.g., relative to the other EVs of the set of EVs) in descending order of priority (e.g., EV having the highest priority at the top of the "turn off" list down to the EV having the lowest priority of the EVs that are on the "turn off" list). The EVs on the "turn off" list can start the scheduling period in the "turned on" state (e.g., charging state) to facilitate meeting the POP associated with the aggregator component 102.

As more fully disclosed herein, when regulation up is desired (e.g., needed) by the aggregator component 102, e.g., due to power conditions (e.g., power regulation conditions) relating to the electric grid 112, an EV(s) at the bottom of the "turn off" list can be turned off and added to the bottom of the "turn on" list. For instance, the dispatch controller component 120 can generate a regulation-up dispatch signal, and can transmit the regulation-up dispatch signal to the EV(s) at the bottom of the "turn off" list or an associated charging station (e.g., 114, 116, or 118), and the EV(s) can be switched to the off or not-charging state. The dispatch controller component 120 also can modify the "turn on" list and "turn off" list by moving this EV(s) from the bottom of the "turn off" list to the bottom of the "turn on" list. At this point, with that EV(s) being moved to be listed at the bottom of the "turn on" list, the dispatch controller component 120 can correspondingly move other EVs of the "turn on" list up in the priority order above that moved EV(s) on the "turn on" list.

The dispatch controller component 120 also can assign the remaining EVs, which can be available to be turned on by the aggregator component 102, to the "turn on" list in descending order of priority of the respective remaining EVs of the set of EVs. The remaining EVs can be EVs with relatively lower priority values relative to the other EVs in the set of EVs (e.g., relative to the EVs on the "turn off" list). The dispatch controller component 120 can facilitate initially switching off (e.g., switching to the off or not-charging state) the EVs on the "turn on" list.

As more fully disclosed herein, when regulation down is desired (e.g., needed) by the aggregator component 102, e.g., due to power conditions relating to the electric grid 112, the dispatch controller component 120 can facilitate switching a specified number of EVs at the top of the "turn on" list to the on state and can add that/those EV(s) to the top of the "turn off" list. For example, the dispatch controller component 120 can generate a regulation-down dispatch signal, and can transmit the regulation-down dispatch signal to the EV(s) at the top of the "turn on" list or an associated charging station (e.g., 114, 116, or 118), and the EV(s) can be switched to the on or charging state. In response to receiving the regulation-down dispatch signal, the EV(s) or an associated charging station(s) can switch the EV(s) to the on or charging state. The dispatch controller component 120 also can modify the "turn on" list and "turn off" list by moving this EV(s) from the top of the "turn on" list to the top of the "turn off" list. At this point, with this EV(s) being moved to be listed at the top of the "turn off" list, the dispatch controller component 120 can correspondingly move an EV, which was previously at the top of the "turn off" list, down in the priority order below the moved EV(s) on the "turn off" list. Also, on the "turn on" list, the dispatch controller component 120 can correspondingly move other EVs that remain in the "turn on" list up in the priority order, wherein the EV which previously was below the moved EV(s) in the priority order of the "turn on" list can move up in priority to the top of the "turn on" list.

With further reference to the method 300 of FIG. 3 (along with FIG. 1), at 308, a regulation signal received from the system (e.g., power system associated with the electric grid 112) can be discretized into increments which can be met by the switching of charging states of individual EVs of the set of EVs. The aggregator component 102 (e.g., the dispatch controller component 120 of the aggregator component 102) can receive the regulation signal (e.g., system regulation signal) from the system. The dispatch controller component 120 can discretize the regulation signal into increments of a defined size that can be met by the switching of charging states of individual EVs of the set of EVs. Generally, for large groups of EVs the differences between the discretized signal and the original signal can be negligible as further disclosed herein in relation to discrete regulation dispatch.

At 310, the number of EVs to be used (e.g., switched to the on or charging state) to follow the regulation signal can be determined, for example, using EQs. (5) and (6) (e.g., by the dispatch controller component 120). The dispatch controller component 120 can determine the amount of energy, $E_R$ (t), that can be desired (e.g., required) to follow the regulation signal given by the system operator, and can determine the number of EVs of the set of EVs that are to be switched to the on state in order to meet that amount of energy, $E_R$ (t). For any time t, these can be given by $$E_R(t) = POP(t) + RegS(t) \qquad \text{EQ. (5)}$$

$$N_{EVs}(t) = E_R(t)/MP \qquad \text{EQ. (6)}$$

wherein:

RegS(t) is the regulation signal from the system at time t;
POP(t) is the aggregator POP at time t;
$N_{EVs}(t)$ is the number of EVs to be used to meet the energy requirement associated with the regulation signal; and
MP is the power draw of an EV when switched to the on state (e.g., charging state).

At 312, a value of m can be determined as a function of n and $N_{EVs}(t)$. The dispatch controller component 120 can determine (e.g., calculate) the value of m as m=n−$N_{EVs}(t)$ to facilitate determining whether any EVs are to be moved between the "turn off" list and the "turn on" list. For instance, the dispatch controller component 120 can compare the desired number n of EVs to be used for charging against the EVs that are on the "turn off" list.

At 314, a determination can be made regarding whether the value of m is greater than 0 (e.g., by a dispatch controller component 120). If it is determined (e.g., by the dispatch controller component 120) that the value of m is greater than 0, at 316, the m EVs at the bottom of the "turn off" list can be moved from the "turn off" list to the bottom of the "turn on" list (e.g., by the dispatch controller component 120).

If, at 314, it is determined (e.g., by the dispatch controller component 120) that the value of m is not greater than 0, at 318, a determination can be made regarding whether the value of m is less than 0 (e.g., by a dispatch controller component 120). If it is determined (e.g., by the dispatch controller component 120) that the value of m is less than 0, at 320, the m EVs at the top of the "turn on" list can be moved to the top of the "turn off" list (e.g., by the dispatch controller component 120). If, at 318, it is determined (e.g., by the dispatch controller component 120) that the value of m is not less than 0 (and thus, m=0), at 322, the "turn off"

list and "turn on" list can remain in their respective current state (e.g., the dispatch controller component 120 can decide to make no changes to the "turn on" list and the "turn off" list).

In some implementations, if the dispatch controller component 120 determines that the total number of EVs that are desired (e.g., needed) to be switched to the on state for charging to meet the regulation signal is m less than the number of EVs on the "turn off" list, the dispatch controller component 120 can move the m EVs at the bottom of the "turn off" list (e.g., m lowest priority EVs on the "turn off" list) to the bottom of the "turn on" list. If the total EVs desired (e.g., needed) to be switched on for charging to meet the regulation signal is m greater than the number of EVs on the "turn off" list, the dispatch controller component 120 can move the top m EVs (e.g., m highest priority EVs) in the "turn on" list to the top of the "turn off" list.

From act 316 or act 320, the method 300 can proceed to act 324. At 324, a switching signal (e.g., switch on signal (e.g., charge signal), or switch off signal (e.g., discontinue charge signal)) can be communicated (e.g., transmitted, sent) to EVs that have moved between the "turn off" list and "turn on" list (e.g., changed from one list to the other list). The dispatch controller component 120 can communicate a corresponding switching signal (e.g., switch on signal or switch off signal) to each of the EVs that have moved from one list to the other list (e.g., the subset of EVs that have moved from one list to the other list). It is not necessary for the dispatch controller component 120 to transmit switching signals to all of the EVs in the set of EVs, as the dispatch controller component 120 can manage switching signaling by communicating corresponding switching signals to the subset of EVs of the set of EVs that have moved between the "turn off" list and "turn on" list. This can substantially reduce the communication overhead in relation to controlling charging (or switching) states of EVs and regulating power generation of the electric grid, as compared to conventional systems and methods.

From act 322 or act 324, the method 300 can proceed to act 326. At 326, a determination can be made regarding whether a scheduling period has ended (e.g., the dispatch controller component 120). If it is determined (e.g., by the dispatch controller component 120) that the scheduling period has not ended, at 328, a determination can be made regarding whether the "turn on" list and the "turn off" list are to be recalculated or redetermined. The dispatch controller component 120 can determine whether the "turn on" list and the "turn off" list are to be recalculated or redetermined based at least in part on, for example, a specified number of dispatches that have been performed or an amount of time that has elapsed since the last time these lists were recalculated or redetermined. In some implementations, the dispatch controller component 120 can dynamically determine whether the "turn on" list and the "turn off" list are to be recalculated or redetermined based at least in part on feedback information received from, for example, the electric grid 112, another component of the aggregator component 102, a charging station (e.g., 114, 116, and/or 118), and/or an EV (e.g., 104, 106, 108, and/or 110).

If, at 328, it is determined that it is time to recalculate or redetermine the "turn on" list and the "turn off" list, the method 300 can return to act 302, wherein the dispatch percentage (DisPer$_i$) of each EV of the set of EVs (e.g., EVs 104 through 110) can be determined (e.g., by the dispatch controller component 120), and the method 300 can proceed from that point to determine respective priority levels of the EVs in the set of EVs, and modify (e.g., reform) the "turn off" list and "turn on" list (e.g., based on the newly determined priority levels of the EVs), etc., in accordance with the method 300 and defined power regulation criterion. If, at 328, it is determined that it is not time to recalculate or redetermine the "turn on" list and the "turn off" list, the method 300 can return to act 308, wherein a regulation signal (e.g., same, new, or next regulation signal) received (e.g., by the aggregator component 102) from the system (e.g., power system associated with the electric grid 112) can be discretized into increments which can be met by the switching of charging states of individual EVs of the set of EVs, and the method 300 can proceed from that point.

Referring again to act 326, if it is determined that the scheduling period has ended, at 330, the method 300 can end. At this point, the dispatch controller component 120 can determine (e.g., identify, calculate) new V2G capacities from the applicable scheduling algorithm.

Figure 4:
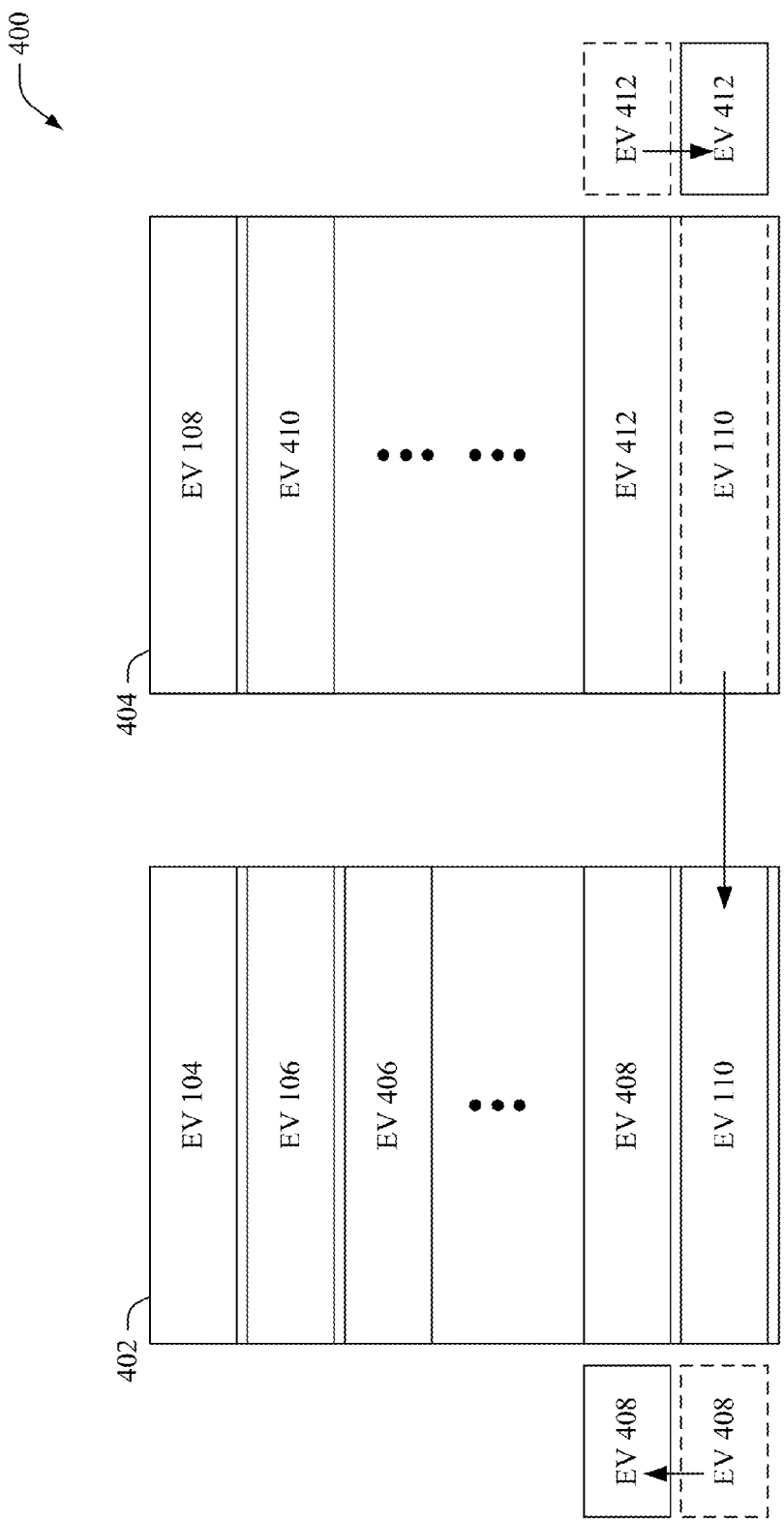
FIG. 4 illustrates a diagram of an example set of switching-priority lists that can be used to facilitate controlling switching of EVs in a V2G environment to facilitate controlling power generation and managing variations of load demand for an electric grid in accordance with various aspects and embodiments of the disclosed subject matter.

Referring briefly to FIG. 4 (along with FIG. 1), FIG. 4 depicts a diagram of an example set of switching-priority lists 400 that can be used (e.g., by the dispatch controller component 120) to facilitate controlling switching of EVs in a V2G environment to facilitate controlling power generation and managing variations of load demand for an electric grid in accordance with various aspects and embodiments of the disclosed subject matter. The set of switching-priority lists 400 can include a "turn on" list 402 that can include a first subset of EVs that can be available to be turned (e.g., switched) to an on state by the dispatch controller component 120, and a "turn off" list 404 that can include a second subset of EVs that can be available to be turned (e.g., switched) to the off state by the dispatch controller component 120, in accordance with defined dispatch criterion.

In accordance with the example set of switching-priority lists 400, the "turn on" list 402 initially can include EV 104, EV 106, EV 406, and EV 408, wherein EV 408 initially can be at the bottom of the "turn on" list 402; and the "turn off" list 404 initially can include EV 108, EV 410, EV 412, and EV 110, wherein EV 110 initially can be at the bottom of the "turn off" list 404. If, for example, regulation up is desired in relation to the electric grid 112, e.g., due to power conditions (e.g., power regulation conditions) relating to the electric grid 112, the dispatch controller component 120 can generate a regulation-up dispatch signal, and can transmit the regulation-up dispatch signal to a subset of EVs, including EV 110 in this example, identified as being at the bottom or lower end of the "turn off" list 404 or an associated charging station (e.g., 114, 116, or 118), and that subset of EVs, including EV 110, or associated charging station can switch the subset of EVs, including EV 110, to the off or not-charging state. The dispatch controller component 120 also can modify the "turn on" list 402 and "turn off" list 404 by moving this subset of EVs, including EV 110, from the bottom of the "turn off" list 404 to the bottom of the "turn on" list 402. At this point, with the EV 110 being moved to be listed at the bottom of the "turn on" list 402, the dispatch controller component 120 can correspondingly move the EV 408 up in the priority order above EV 110 (and/or other EVs, if any, in the subset of EVs) on the "turn on" list 402.

Figure 5:
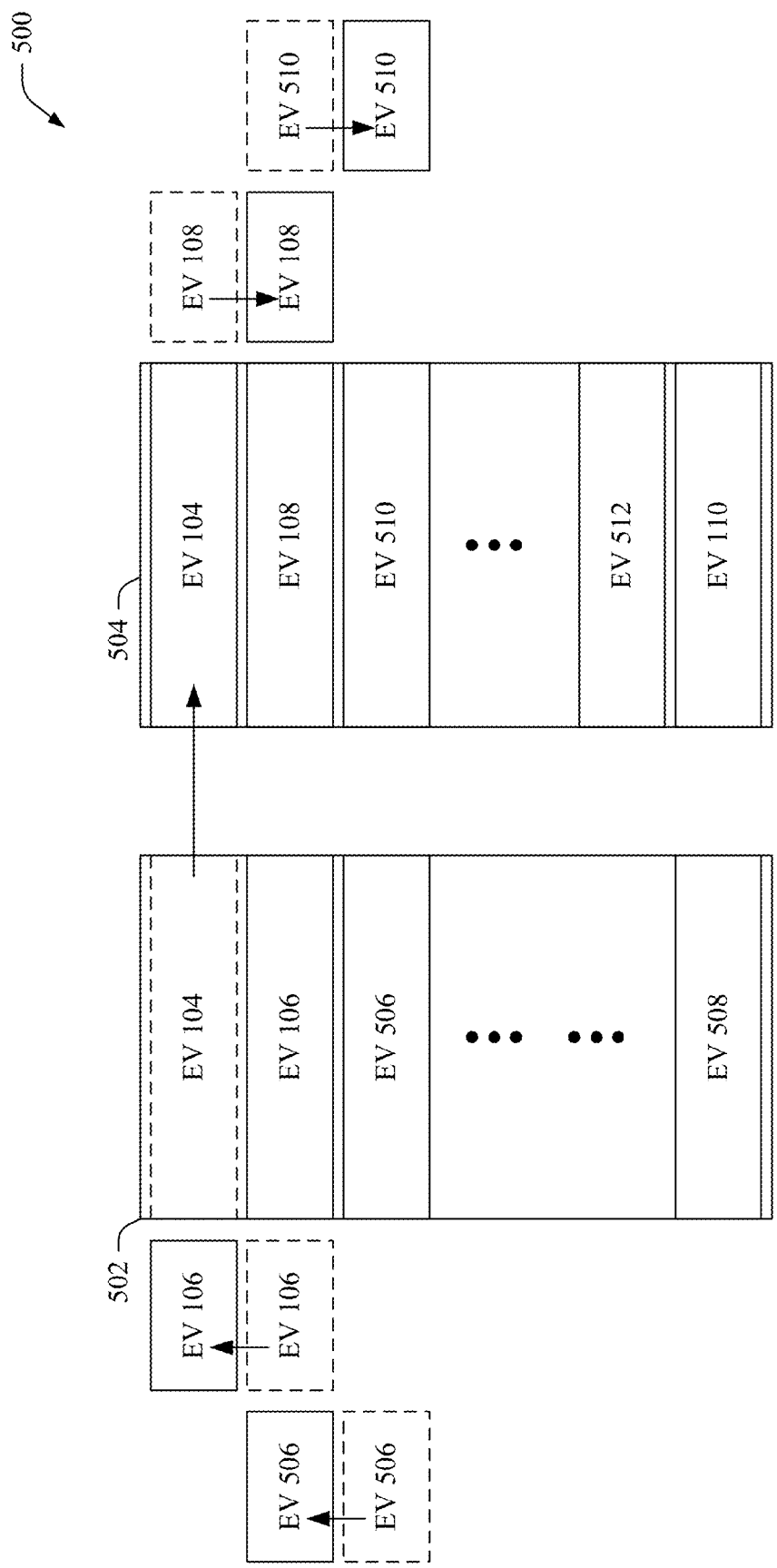
FIG. 5 depicts a diagram of another example set of switching-priority lists that can be used to facilitate controlling switching of EVs in a V2G environment to facilitate controlling power generation and managing variations of load demand for an electric grid in accordance with various aspects and embodiments of the disclosed subject matter.

Referring briefly to FIG. 5 (along with FIG. 1), FIG. 5 depicts a diagram of another example set of switching-priority lists 500 that can be used (e.g., by the dispatch controller component 120) to facilitate controlling switching of EVs in a V2G environment to facilitate controlling power generation and managing variations of load demand for an electric grid in accordance with various aspects and embodiments of the disclosed subject matter. The set of switching-priority lists 500 can include a "turn on" list 502 that can include a first subset of EVs that can be available to be turned (e.g., switched) to an on state by the dispatch controller component 120, and a "turn off" list 504 that can include a second subset of EVs that can be available to be turned (e.g., switched) to the off state by the dispatch controller component 120, in accordance with defined dispatch criterion.

In accordance with the example set of switching-priority lists 500, the "turn on" list 502 initially can include EV 104, EV 106, EV 506, and EV 508, wherein EV 104 initially can be at the top of the "turn on" list 502; and the "turn off" list 504 initially can include EV 108, EV 510, EV 512, and EV 110, wherein EV 108 initially can be at the top of the "turn off" list 504. If, for example, regulation down is desired in relation to the electric grid 112, e.g., due to power conditions (e.g., power regulation conditions) relating to the electric grid 112, the dispatch controller component 120 can generate a regulation-down dispatch signal, and can transmit the regulation-down dispatch signal to a subset of EVs, including EV 104, at the top of the "turn on" list 502 or an associated charging station(s) (e.g., 114, 116, or 118). In response to receiving the regulation-down dispatch signal, the subset of EVs, including EV 104, or an associated charging station(s) can switch the subset of EVs, including EV 104, to the on or charging state. The dispatch controller component 120 also can modify the "turn on" list 502 and "turn off" list 504 by moving this subset of EVs, including EV 104, from the top of the "turn on" list 502 to the top of the "turn off" list 504. At this point, with the EV 104 being moved to be listed at the top of the "turn off" list 504, the dispatch controller component 120 can correspondingly move the EV 108 down in the priority order below EV 104 (and/or other EVs, if any, in the subset of EVs) on the "turn off" list 504. Also, the dispatch controller component 120 can correspondingly move the other EVs (e.g., EVs 106, 406, and 408) up in the priority order for the "turn on" list 502. For example, if EV 104 was the only EV in the subset of EVs, the dispatch controller component 120 can move EV 106 up to the top of the "turn on" list 502 and can correspondingly move the other EVs, including EV 506, up in priority on the "turn on" list 502.

One of the benefits of the disclosed subject matter, by employing the defined dispatch algorithm and aggregator component 102, is that the disclosed subject matter can be implemented by installing a remote switch on a charging station (e.g., 114, 116, 118). Thus, infrastructure costs associated with the disclosed subject matter can be relatively low as compared to conventional systems and methods. One of the other benefits of the disclosed subject matter, by employing the defined dispatch algorithm and aggregator component 102, is that communication overhead relating to controlling charging states of the EVs and regulating power generation for an electric grid can be reduced because the dispatch controller component 120 can effectively control the charging states of the EVs and regulating power generation for the electric grid 112 by communicating switching signals to only the subset of EVs of the set of EVs (e.g., EVs 104, 106, 108, and/or 110) that are changing charging state at a given time. As a result, communication overhead of the disclosed subject matter can be reduced or minimized as compared to conventional systems and methods.

Figure 6:
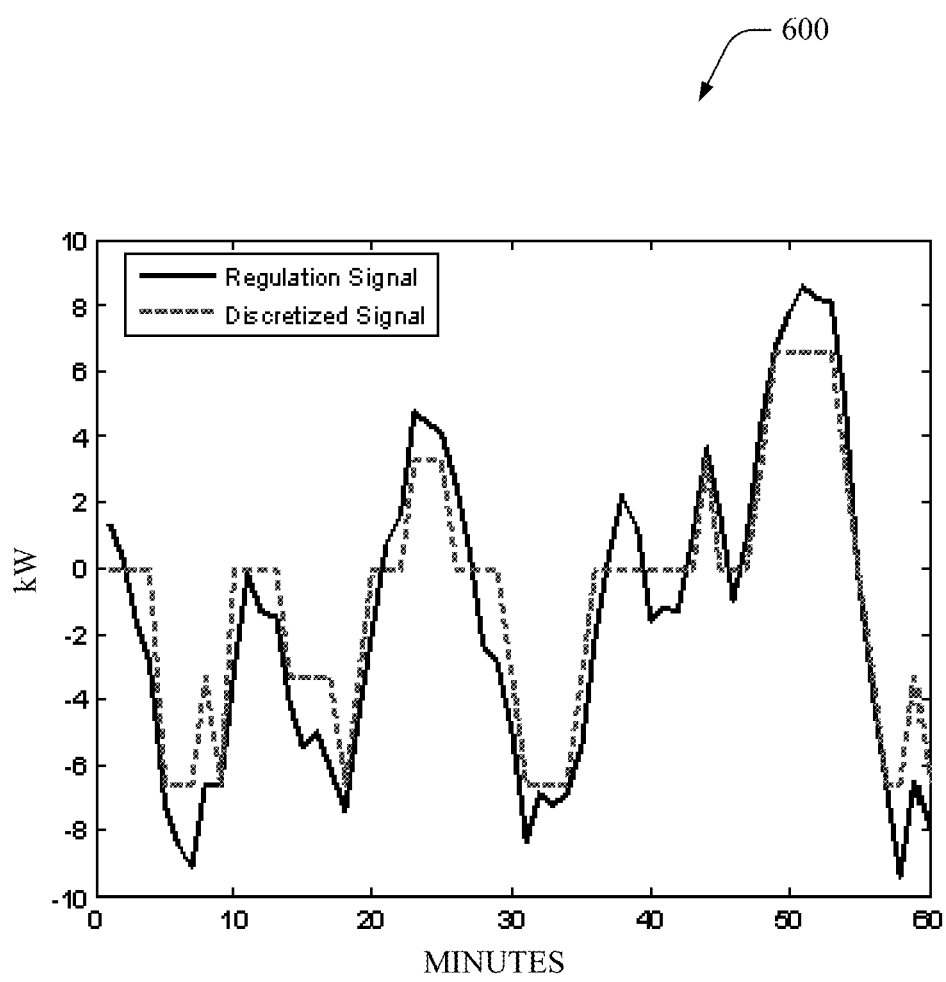
FIG. 6 depicts a graph that compares a discrete regulation signal to a continuous regulation signal with 10 EVs, which charge at 3.3 kW, and are associated with the ERCOT system over a one-hour period.
Figure 7:
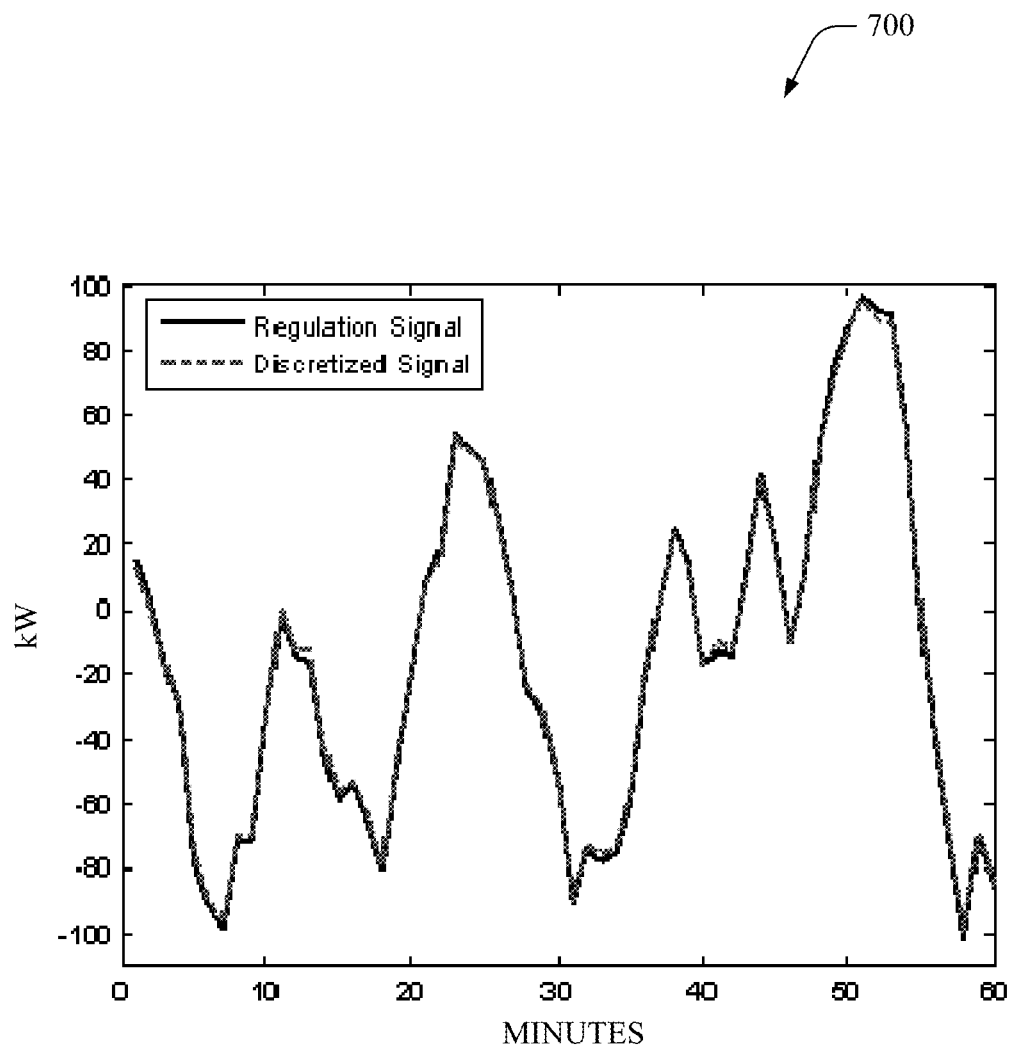
FIG. 7 depicts a graph that compares a discrete regulation signal to a continuous regulation signal with 100 EVs, which charge at 3.3 kW, and are associated with the ERCOT system over a one-hour period.

With regard to discrete regulation dispatch, one of the aspects of the defined dispatch algorithm is that the defined dispatch algorithm (and thus, the dispatch controller component 120 employing that algorithm) can discretize the system regulation signal into increments that can be met by the switching of individual EVs of the set of EVs (e.g., EVs 104 through 110). This can introduce error into the response of the aggregator to the regulation signal. For a small number of EVs, this error may be relatively large as depicted in FIG. 6. FIG. 6 depicts a diagram of an example graph 600 that compares a discrete regulation signal to a continuous regulation signal with only 10 EVs, which charge at 3.3 kW (e.g., which is the charger size on a Nissan Leaf) and are associated with the ERCOT system, over a one-hour period. As the number of EVs participating increases (e.g., the number of EVs associated with the ERCOT system increases), the error in the response of the aggregator to the regulation signal can decrease significantly, as is illustrated in FIG. 7, which depicts a diagram of an a graph 700 that compares a discrete regulation signal to a continuous regulation signal with 100 EVs, which charge at 3.3 kW and are associated with the ERCOT system, over a one-hour period.

Figure 8:
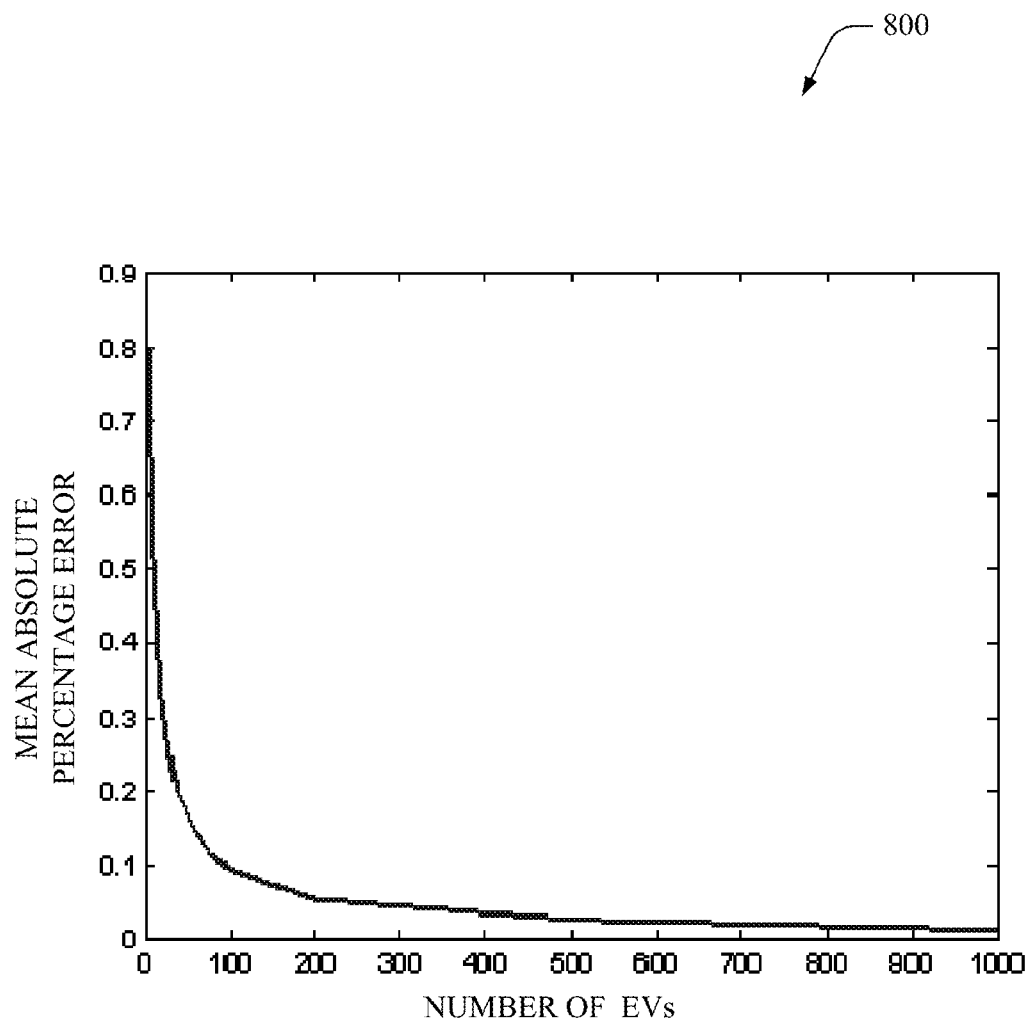
FIG. 8 illustrates a graph of the mean absolute percentage error of the discretized regulation signal as the number of EVs associated with a power system (e.g., ERCOT system) increases.

FIG. 8 illustrates a diagram of an example graph 800 of the mean absolute percentage error of the discretized regulation signal as the number of EVs associated with a power system (e.g., ERCOT system) increases. The graph 800 illustrates the error reduction with EV size for a 3-month period on the ERCOT system. The graph 800 shows that, at 100 EVs, the mean absolute percentage error can be less than 10% and, at 1000 EVs, the mean absolute percentage can be less than 1.5%. Such a small amount of error generally can be acceptable for regulation dispatch.

Figure 9:
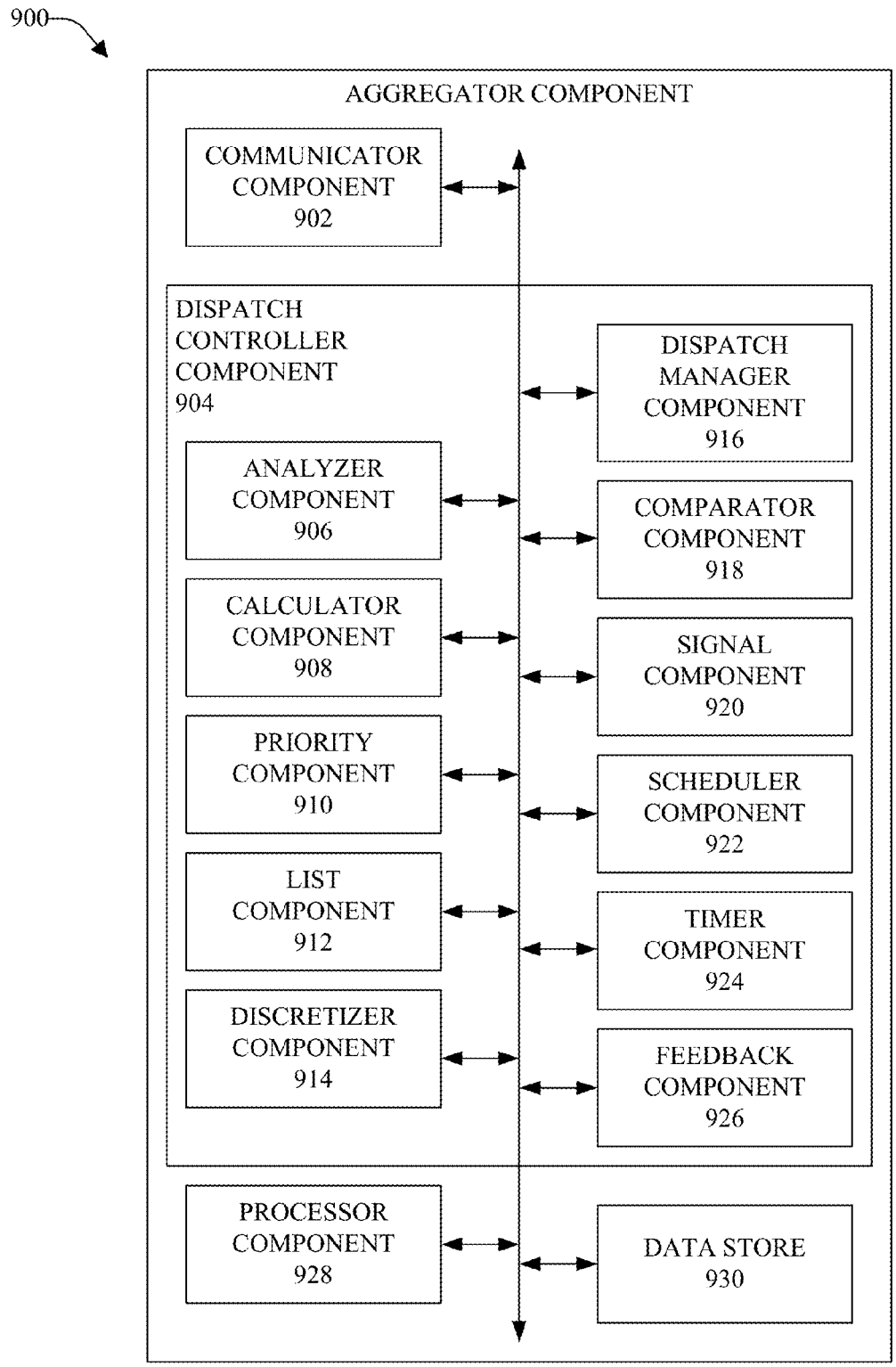
FIG. 9 depicts a block diagram of an example aggregator component in accordance with various aspects and embodiments of the disclosed subject matter.

FIG. 9 depicts a block diagram of an example aggregator component 900 in accordance with various aspects and embodiments of the disclosed subject matter. The aggregator component 900 can be associated with one or more electric grids (not shown in FIG. 9; e.g., an electric grid as shown in FIG. 1), one or more charging stations (not shown in FIG. 9; e.g., a charging station(s) as shown in FIG. 1), and/or one or more EVs (not shown in FIG. 9; e.g., an EV(s) as shown in FIG. 1).

The aggregator component 900 can include a communicator component 902 that can communicate (e.g., transmit, receive) information between the aggregator component 900 and other components (e.g., charging station(s), EV(s), communication network(s), processor(s), data store(s), etc.). The information can include or relate to, for example, regulation signals, power condition information associated with an electric grid, dispatch signals, an algorithm(s) (e.g., defined dispatch algorithm(s)), etc. The aggregator component 900 can use received information to facilitate determining whether an EV(s) is to switch charging states to respond to a power-related condition associated with an electric grid, determining whether an EV(s) and/or which EV(s) is to be switched to a charging state or a not-charging state, determine which EV(s) is to be moved between a "turn on" list and a "turn off" list, etc. The communicator component 902 can transmit a dispatch signal (e.g., regulation-up dispatch signal, regulation-down dispatch signal, etc.) to, for example, a charging station(s) and/or EV(s) to facilitate controlling switching of EVs between a charging state and not-charging state, in accordance with a defined dispatch algorithm. In some implementations, the communicator component 902 can establish a communication channel (e.g., wireline or wireless communication channel) to communicate information between the aggregator component 900 and another component(s) (e.g., charging station(s), EV(s), etc.) to facilitate communicating information between the aggregator component 900 and the other component(s).

The aggregator component 900 can include a dispatch controller component 904 that can be employed to control switching of EVs associated with the aggregator component 900 between a charging state and not-charging state, in accordance with a defined dispatch algorithm. The dispatch controller component 904 can contain an analyzer component 906 that can analyze or evaluate information relating to power conditions associated with an electric grid(s), a charging station(s), an EV(s), etc., to facilitate controlling switching of EVs associated with the aggregator component 900 between a charging state and not-charging state. The analyzer component 906 can generate analysis results based at least in part on its analysis of the information, and can provide the analysis results to another component(s) of the dispatch controller component 904 to facilitate enabling the dispatch controller component 904 to make determinations relating to switching of EVs associated with the aggregator component 900 between a charging state and not-charging state, as more fully disclosed herein.

The dispatch controller component 904 also can comprise a calculator component 908 that can perform calculations on data (e.g., implementing, and in accordance with, the equations disclosed herein). In some implementations, the calculator component 908 can calculate a dispatch percentage and a dispatch error for respective EVs associated with the aggregator component 900, for example, using the equations disclosed herein relation to calculating dispatch percentage and dispatch error. The dispatch controller component 904 can use the calculated dispatch percentages and dispatch errors of EVs to generate switching-priority lists, such as a "turn on" list and a "turn off" list, that can include respective subsets of EVs based at least in part on the respective priorities of EVs in relation to charging of EVs.

The dispatch controller component 904 can include a priority component 910 and a list component 912. The priority component 910 can identify respective charging-related priorities of EVs associated with the aggregator component 900, based at least in part on the respective dispatch percentages and dispatch errors of the EVs. The list component 912 can assign EVs to respective switching-priority lists and can arrange the EVs within the respective switching-priority lists in a priority order or ranking, based at least in part on the respective charging-related priorities of the EVs and/or movements of respective EVs between the respective switching-priority lists in response to power conditions relating to an electric grid (e.g., in response a regulation signal received from a component associated with an electric grid), in accordance with the defined dispatch algorithm.

The dispatch controller component 904 can comprise a discretizer component 914 that can discretize a regulation signal received from a component associated with an electric grid into increment values, wherein the discretized length of the increments can be of a specified size, in accordance with defined power regulation criterion. The discretizer component 914 can identify, select, and/or assign an increment value for a particular increment of a regulation signal based at least in part on the actual values of the regulation signal, the length of the increment, and/or defined power regulation criterion.

The dispatch controller component 904 can include a dispatch manager component 916 that can manage data flow between various components of the dispatch controller component 904. The dispatch manager component 916 also can make determinations relating to controlling switching of EVs between a charging state and a not-charging state, calculating or identifying respective priorities of EVs, generating or modifying switching-priority lists, performance of functions in response to received regulation signals, performance of functions in response to information received from other components (e.g., EV(s), charging station(s), etc.) associated with the aggregator component 900, etc. The dispatch manager component 916 can facilitate communicating dispatch signals (e.g., regulation-up signal, regulation-down signal) to respective EVs and/or associated charging stations to facilitate controlling switching of EVs between a charging state and a not-charging state, in accordance with a defined dispatch algorithm.

The dispatch controller component 904 can contain a comparator component 918 that can compare a data value with one or more other data values to determine which data value is greater in value than, lesser in value than, or equal in value to another value, and/or to facilitate determining a relative order or ranking (e.g., priority order or ranking) of data values in relation to each other. For example, as part of the defined dispatch algorithm, the comparator component 918 can compare the value of m to 0 to determine whether the value of m is greater than or less than 0 to facilitate determining whether to move a subset of EVs from one switching-priority list to another switching-priority list and determining a switching-priority list to which the subset of EVs are to be moved. The value of the parameter m can be calculated as a function of the parameter n and $N_{EVs}(t)$, wherein $N_{EVs}(t)$ is the number of EVs to be used to meet the energy requirement associated with a regulation signal and the parameter n can relate to the n highest priorities of EVs of the set of EVs to meet the POP associated with the aggregator component (e.g., 900). The value of n can be virtually any desired integer number ranging up to the number of EVs in the set of EVs, and can be determined and/or set based at least in part on one or more defined dispatch criterion.

The dispatch controller component 904 can include a signal component 920 that can receive regulation signals (e.g., power regulation signals) associated with an electric grid(s) associated with the aggregator component 900. The signal component 920 also can generate dispatch signals, such as a regulation-up dispatch signal and a regulation-down dispatch signal, that the communicator component 902 can transmit to one or more EVs and/or one or more charging stations associated with those EVs to facilitate controlling switching of EVs between a charging state and a not-charging state. The dispatch signals can be used, for example, to facilitate enabling the aggregator component 900 to meet a regulation signal.

The dispatch controller component 904 can comprise a scheduler component 922 that can maintain and manage a schedule period for the switching-priority lists and EVs associated with the aggregator component 900. The scheduler component 922 can set the schedule period to be a defined period of time, a defined number of dispatches, or a dynamically determined period of time, based at least in part on defined dispatch criterion. The scheduler component 922 can determine whether the switch-priority lists (e.g., "turn on" list and the "turn off" list) are to be recalculated or redetermined based at least in part on the schedule period, wherein when the scheduler component 922 identifies the schedule period as being expired, the scheduler component 922 can communicate information indicating the schedule period has expired to the dispatch manager component 916. In response, the dispatch manager component 916 can control operations by other components (e.g., analyzer component 906, calculator component 908, priority component 910, list component 912, etc.) to recalculate or redetermine the switching-priority lists, in accordance with defined dispatch criterion. In some implementations, the scheduler component 922 and/or dispatch manager component 916 can dynamically determine whether the "turn on" list and the "turn off" list are to be recalculated or redetermined based at least in part on feedback information received from, for example, an electric grid, another component(s) of the aggregator component 900, a charging station(s), and/or an EV(s).

The dispatch controller component 904 can contain a timer component 924 that can identify time, track time, and/or manage time in relation to operations of the aggregator component 900. For instance, the timer component 924 can identify and/or track an amount of time that has elapsed since the switching-priority lists were last redetermined or recalculated. In some implementations, the timer component 924 can identify and/or track time as a function of events, wherein, for example, the timer component 924 can identify and/or track the number of dispatches have occurred since the switching-priority lists were last redetermined or recalculated. The timer component 924 can communicate the amount of elapsed time or number of times an event (e.g., dispatch) has occurred to the scheduler component 922 and/or the dispatch manager component 916 to facilitate determining whether the switching-priority lists are to be redetermined or recalculated.

The dispatch controller component 904 can include a feedback component 926 that can monitor, detect, obtain, and/or receive feedback information from, for example, an electric grid, another component(s) of the aggregator component 900, a charging station(s), an EV(s), etc., in relation to operations of the aggregator component 900, such as determinations relating the switching-priority lists. The feedback component 926 can provide the feedback information to the scheduler component 922, dispatch manager component 916, analyzer component 906, and/or another component of the aggregator component 900, wherein one or more of those components can use the feedback information to, for example, facilitate dynamically determining whether a "turn on" list and a "turn off" list are to be recalculated or redetermined.

In some implementations, the aggregator component 900 also can include a processor component 928 that can operate in conjunction with the other components (e.g., communicator component 902, dispatch controller component 904, analyzer component 906, etc.) to facilitate performing the various functions of the aggregator component 900. The processor component 928 can employ one or more processors, microprocessors, or controllers that can process data, such as information relating to charging of EVs, charging states of EVs, regulation signals, discretizing regulation signals, dispatch signals, respective priority levels or values of EVs, switching-priority lists, schedule periods for switching-priority lists, feedback information, defined dispatch algorithm, defined dispatch criterion(s), information relating to other operations of the aggregator component 900, and/or other information, etc., to facilitate controlling charging of EVs, controlling switching of EVs between a charging state and a not-charging state, responding to a regulation signal, performing other functions or calculations associated with the defined dispatch algorithm, and/or performing other operations associated with the aggregator component 900, as more fully disclosed herein. The processor component 928 can control data flow between the aggregator component 900 and other components (e.g., charging station(s), EV(s), electric grid(s), processor(s), data store(s), communication network(s) (e.g., Internet, intranet, local area network (LAN), wireless network, etc.), computer-readable storage media, etc.) associated with the aggregator component 900.

The aggregator component 900 also can include a data store 930 that can store data structures (e.g., user data, video content, metadata), instructions, procedures, and/or code structure(s) (e.g., modules, objects, hashes, classes) to facilitate performing or controlling operations associated with the aggregator component 900. The data store 930 also can store information relating to charging of EVs, charging states of EVs, regulation signals, discretizing regulation signals, dispatch signals, respective priority levels or values of EVs, switching-priority lists, schedule periods for switching-priority lists, feedback information, defined dispatch algorithm, defined dispatch criterion(s), and/or information relating to other operations of the aggregator component 900, etc., to performing or controlling operations, associated with the aggregator component 900. The processor component 928 can be coupled (e.g., through a memory bus) to the data store 930 in order to store and retrieve information desired to operate and/or confer functionality, at least in part, to the components (e.g., communicator component 902, dispatch controller component 904, analyzer component 906, etc.) of the aggregator component 900, and/or substantially any other operational aspects of the aggregator component 900.

While the aggregator component 900 and the dispatch controller component 904 depict certain components as being within the dispatch controller component 904 and other components being separate from the dispatch controller component 904, the disclosed subject matter is not so limited. In accordance with various implementations, the components of the aggregator component 900 and dispatch controller component 904 can be arranged and/or configured, as desired. For example, the analyzer component 906 can be located outside of the dispatch controller component 904 and/or the communicator component 902 can be located within the dispatch controller component 904.

Figure 10:
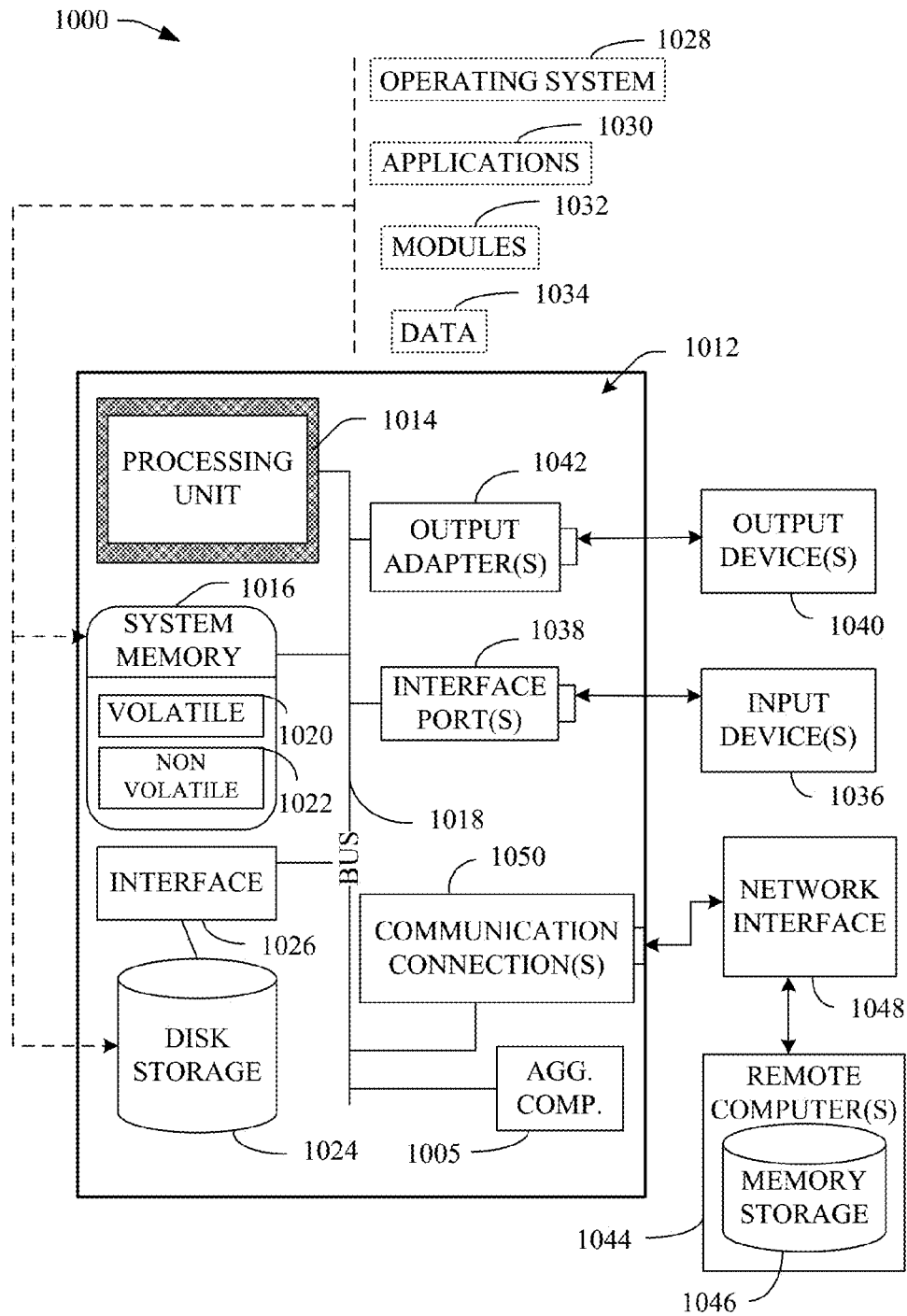
FIG. 10 is a schematic block diagram illustrating a suitable operating environment.
Figure 11:
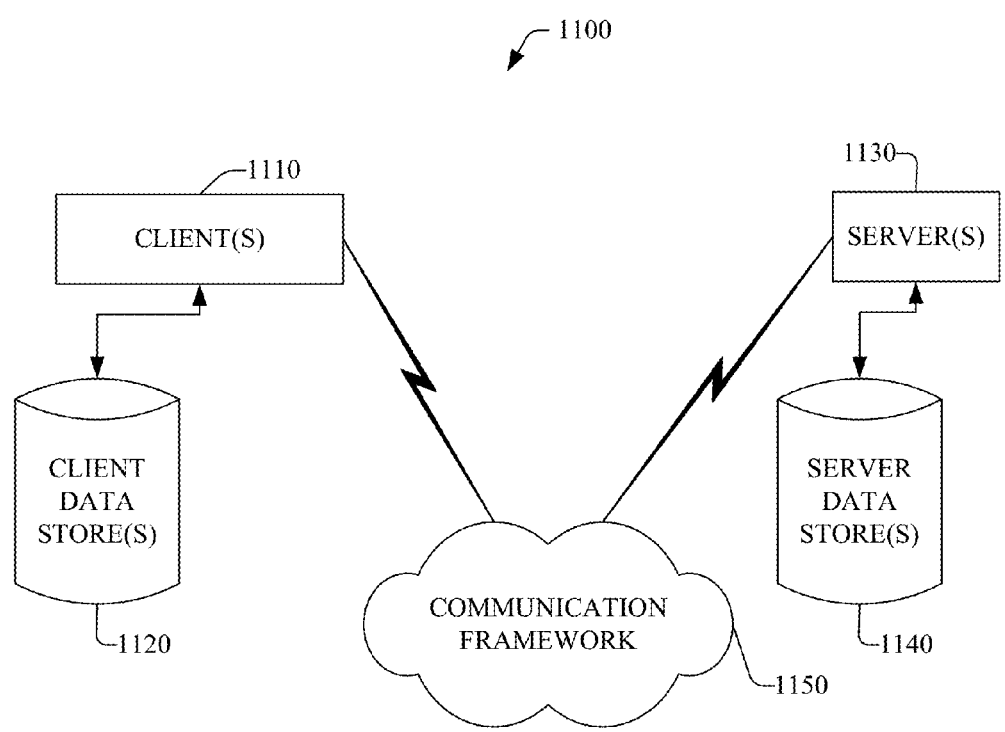
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed subject matter also may be implemented in combination with other program modules. Generally, program modules include routines, programs, components, data structures, etc. that can perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, electronic tablet or pad, electronic gaming device, watch, etc.), microprocessor-based or programmable consumer or industrial electronics, and the like. The illustrated aspects may also be practiced in distributed computing environments where tasks are performed by remote processing devices that are linked through a communications network. However, some, if not all aspects of the disclosed subject matter can be practiced on stand-alone computers. In a distributed computing environment, program modules may be located in both local and remote memory storage devices.

With reference to FIG. 10, a suitable environment 1000 (e.g., system 1000) for implementing various aspects of the disclosed subject matter includes a computer 1012. The computer 1012 includes a processing unit 1014, a system memory 1016, and a system bus 1018. The system bus 1018 can couple system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

In some implementations, the system 1000 also can include an aggregator component 1005 (referred to in FIG. 10 as "agg. comp. 1005), which can include a dispatch controller component (e.g., dispatch controller component 120 (not shown in FIG. 10; as depicted in FIG. 1). The aggregator component 1005 can control switching of EVs in a V2G environment to facilitate controlling power generation and managing variations of load demand for an electric grid in accordance with various aspects and embodiments of the disclosed subject matter, as more fully disclosed herein.

FIG. 11 is a schematic block diagram of a sample-computing environment 1100 with which the subject specification can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the disclosed subject matter, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

It is to be appreciated and understood that components (e.g., aggregator component, dispatch controller component, charging station, EV, etc.), as described with regard to a particular system or method, can include the same or similar functionality as respective components (e.g., respectively named components or similarly named components) as described with regard to other systems or methods disclosed herein.

As used in this application, the terms "component," "system," "platform," "interface," "node", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wireline networks (which use IEEE 802.3 or Ethernet). Wi-Fi networks typically operate in the unlicensed 2.4 and 5 GHz radio bands, at an 11 Mbps (802.11b) or a 54 Mbps (802.11a) data rate, for example, or with products that contain both bands (dual band), so the networks can provide real-world performance similar to the basic "10BaseT" wireline Ethernet networks used in many offices.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM)). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory (e.g., card, stick, key drive . . . ) or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the disclosed subject matter. It is, of course, not possible to describe every conceivable combination of components or methods for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor, coupled to a memory, that executes or facilitates execution of executable components, comprising:
      an aggregator component that aggregates a set of electric vehicles (EVs) associated with an electric grid; and
      a dispatch controller component that generates a first switching-priority group comprising a first subset of EVs of the set of EVs and a second switching-priority group comprising a second subset of EVs of the set of EVs, and controls switching of respective EVs of the set of EVs between an on state and an off state at a given time, based at least in part on respective priority levels of the respective EVs, wherein the first subset of EVs are associated with a first subset of priority levels and the second subset of EVs are associated with a second subset of priority levels, and wherein the dispatch controller component redetermines the respective priority levels of the respective EVs in response to an occurrence of a condition of a set of conditions relating to at least one of EV dispatches, a time since a determination or a redetermination of the respective priority levels, or feedback information associated with the respective EVs.

2. The system of claim 1, wherein the on state is a charging state, wherein at least one EV of the first switching-priority group is being charged by the electric grid, and the off state is a not-charging state, and wherein at least one other EV that is in the second switching-priority group is not being charged by the electric grid.

3. The system of claim 1, wherein the dispatch controller component communicates a corresponding switching signal to an EV of the set of EVs or to a charging station associated with the EV to facilitate switching of the EV between the on state and the off state at the given time.

4. The system of claim 1, wherein the dispatch controller component determines a dispatch percentage of an EV of the set of EVs, and determines a priority level of the EV based at least in part on a dispatch error between a dispatch of the EV at a defined point in the scheduling period and a target dispatch of the EV, and wherein the dispatch error is determined as a function of the dispatch percentage.

5. The system of claim 1, wherein the dispatch controller component determines the respective priority levels of the respective EVs, and wherein a defined number of EVs of the set of EVs, having been determined to have higher priority levels relative to other EVs of the set of EVs, are included in the first switching-priority group and the other EVs, having been determined to have lower priority levels than the first subset of EVs, are included in the second switching-priority group.

6. The system of claim 1, wherein the dispatch controller component discretizes a regulation signal received from a power system associated with the electric grid into increments that are attainable by switching of charging states of individual EVs of the set of EVs.

7. The system of claim 6, wherein the dispatch controller component determines a specified number of EVs of the set of EVs to be used to follow the regulation signal based at least in part on an amount of energy to be used to follow the regulation signal.

8. The system of claim 7, wherein the dispatch controller component at least one of:
moves a third subset of EVs of the first subset of EVs to the second subset of EVs to include the third subset of EVs on the second switching-priority group, or
moves a fourth subset of EVs of the second subset of EVs to the first subset of EVs to include the fourth subset of EVs on the first switching-priority group, based at least in part on the number of EVs of the set of EVs to be used to follow the regulation signal.

9. The system of claim 8, wherein the dispatch controller component communicates a corresponding switching signal to at least one of the third subset of EVs or the fourth subset of EVs to facilitate switching at least one of the third subset of EVs or the fourth subset of EVs between the on state and the off state.

10. The system of claim 1, wherein the dispatch controller component redetermines the respective priority levels of the respective EVs at least one of after a defined number of dispatches have been made to at least some EVs of the set of EVs, a defined period of time has elapsed since the determination or the redetermination of the respective priority levels of the respective EVs, or dynamically based at least in part on feedback information obtained from at least one of the electric grid, one or more EVs of the set of EVs, a charging station associated with the one or more EVs, or the aggregator component.

11. A method, comprising:
with respect to a set of electric vehicles (EVs) associated with an electric grid, generating, by a system comprising a processor, a first group comprising a first subset of EVs and a second group comprising a second subset of EVs of the set of EVs, based at least in part on respective priority levels of respective EVs of the set of EVs, wherein the first subset of EVs are associated with a first subset of priority levels and the second subset of EVs are associated with a second subset of priority levels;
controlling, by the system, switching of at least a portion of the respective EVs between a charging state and a not-charging state at a given time, based at least in part on the respective priority levels of the respective EVs; and
recalculating, by the system, the respective priority levels of the respective EVs based on an occurrence of a condition of a set of conditions relating to at least one of EV dispatches, an amount of time since a calculation or a recalculation of the respective priority levels, or feedback information associated with the respective EVs.

12. The method of claim 11, further comprising:
transmitting, by the system, a switching signal to an EV of the set of EVs to facilitate switching of the EV between the charging state and the not-charging state at the given time.

13. The method of claim 11, further comprising:
determining, by the system, a dispatch percentage of an EV of the set of EVs; and
determining, by the system, a dispatch error between a dispatch of the EV to a defined point in time and a target dispatch of the EV as a function of the dispatch percentage.

14. The method of claim 11, further comprising:
determining, by the system, the respective priority levels of the respective Evs, wherein the first subset of EVs of the first group are in the charging state and are available to be switched to the not-charging state, and the second subset of EVs of the second group are in the not-charging state and are available to be switched to the charging state, and
wherein the generating further comprises generating the first group and the second group based at least in part on the respective priority levels of the respective EVs, wherein a defined number of EVs of the set of EVs, having higher priority levels relative to other EVs of the set of EVs, are included in the first group and the other EVs, having lower priority levels than the defined number of EVs, are included in the second group.

15. The method of claim 11, further comprising:
receiving, by the system, a regulation signal from a power system; and
discretizing, by the system, the regulation signal into increments as a function of attainable switching of charging states of the respective EVs of the set of EVs.

16. The method of claim 15, further comprising:
determining, by the system, a number of EVs of the set of EVs to be used to follow the regulation signal.

17. The method of claim 16, further comprising:
at least one of:
moving, by the system, a third subset of EVs of the first subset of EVs to the second subset of EVs to include the third set of EVs in the second grouping, or
moving, by the system, a fourth subset of EVs of the second subset of EVs to the first subset of EVs to include the fourth subset of EVs in the first grouping, based at least in part on the number of EVs of the set of EVs to be used to follow the regulation signal; and
transmitting, by the system, at least one corresponding switching signal to at least one of the third subset of EVs or the fourth subset of EVs to facilitate switching at least one of the third subset of EVs or the fourth subset of EVs between the charging state and the not-charging state.

18. The method of claim 11, wherein the recalculating comprises recalculating the respective priority levels of the respective EVs at least one of after a defined number of dispatches have been made to some EVs of the set of EVs, a defined period of time has elapsed since the calculation or the recalculation of the respective priority levels, or dynamically based at least in part on feedback information obtained from at least one of the electric grid, one or more EVs of the set of EVs, a charging station associated with the one or more EVs of the set of EVs, or an aggregator component associated with the set of EVs.

19. A non-transitory computer-readable storage medium storing executable instructions that, in response to execution, cause a system including at least one processor to perform operations, comprising:
to facilitate charging of respective electric vehicles (EVs) of a set of EVs associated with an electric grid, generating a first group comprising a first subset of EVs and a second group comprising a second subset of EVs of the set of EVs, based at least in part on respective priority levels of the respective EVs, wherein the first subset of EVs are associated with a first subset of priority levels and the second subset of EVs are associated with a second subset of priority levels that are lower priority levels than the first subset of priority levels;

controlling transitioning of a portion of the respective EVs between a charging state and a not-charging state at a given time, based at least in part on the respective priority levels of the respective EVs; and redetermining the respective priority levels of the respective EVs in response to an occurrence of a condition of a set of conditions relating to at least one of EV dispatches, a time since a determination or a redetermination of the respective priority levels, or feedback information associated with the respective EVs.

20. The non-transitory computer-readable storage medium of claim 19, wherein the operations further comprise:

communicating a switching signal to an EV of at least one of the first subset of EVs or the second subset of EVs to facilitate switching the EV between the charging state and the not-charging state at the given time.

* * * * *

UNITED STATES PATENT AND TRADEMARK OFFICE
CERTIFICATE OF CORRECTION

| | | |
|---|---|---|
| PATENT NO. | : 9,845,016 B2 | |
| APPLICATION NO. | : 14/720508 | |
| DATED | : December 19, 2017 | |
| INVENTOR(S) | : Eric Sortomme | |

It is certified that error appears in the above-identified patent and that said Letters Patent is hereby corrected as shown below:

In the Specification

Column 1 Add Paragraph:
GOVERNMENT CONTRACT
This invention was made with government support under DE-OE0000551 awarded by US Department of Energy. The government has certain rights in the invention.

Signed and Sealed this
Fourth Day of November, 2025

John A. Squires
*Director of the United States Patent and Trademark Office*